United States Patent
Okano et al.

(10) Patent No.: US 9,151,894 B2
(45) Date of Patent: Oct. 6, 2015

(54) LIGHT SOURCE CIRCUIT AND LIGHT SOURCE DEVICE EQUIPPED WITH SAME

(71) Applicants: National Institute of Advanced Industrial Science and Technology, Tokyo (JP); NEC Corporation, Tokyo (JP); Fujitsu Limited, Kanagawa (JP)

(72) Inventors: Makoto Okano, Ibaraki (JP); Masahiko Mori, Ibaraki (JP); Masashige Ishizaka, Tokyo (JP); Takanori Shimizu, Tokyo (JP); Nobuaki Hatori, Kanagawa (JP)

(73) Assignees: NATIONAL INSTITUTE OF ADVANCED INDUSTRIAL SCIENCE AND TECHNOLOGY (JP); NEC CORPORATION (JP); FUJITSU LIMITED (JP)

( * ) Notice: Subject to any disclaimer, the term of this patent is extended or adjusted under 35 U.S.C. 154(b) by 0 days.

(21) Appl. No.: 14/382,742

(22) PCT Filed: Feb. 27, 2013

(86) PCT No.: PCT/JP2013/055105
§ 371 (c)(1),
(2) Date: Sep. 3, 2014

(87) PCT Pub. No.: WO2013/133099
PCT Pub. Date: Sep. 12, 2013

(65) Prior Publication Data
US 2015/0036964 A1 Feb. 5, 2015

(30) Foreign Application Priority Data

Mar. 8, 2012 (JP) ................................. 2012-051473

(51) Int. Cl.
*G02B 6/125* (2006.01)
*G02F 1/31* (2006.01)
(Continued)

(52) U.S. Cl.
CPC .............. *G02B 6/125* (2013.01); *G02B 6/4296* (2013.01); *G02F 1/225* (2013.01); *G02F 1/3138* (2013.01);
(Continued)

(58) Field of Classification Search
None
See application file for complete search history.

(56) References Cited

U.S. PATENT DOCUMENTS

| 4,909,584 A * | 3/1990 | Imoto et al. ..................... 385/24 |
| 7,734,189 B2 | 6/2010 | Ranganath .................... 398/182 |
| 2008/0131141 A1 | 6/2008 | Ranganath .................... 398/183 |

FOREIGN PATENT DOCUMENTS

| JP | H05249419 | 9/1993 | ............... G02B 6/12 |
| JP | H09269428 | 10/1997 | ............. G02B 6/122 |

(Continued)

OTHER PUBLICATIONS

International Preliminary Report on Patentability issued in corresponding PCT Patent Appln. No. PCT/JP2013/055105 dated Sep. 9, 2014, English translation (8 pgs).

(Continued)

*Primary Examiner* — Jerry Rahll
(74) *Attorney, Agent, or Firm* — Hayes Soloway P.C.

(57) ABSTRACT

A light source circuit transmits light incident from a semiconductor laser source to a plurality of optical devices. At least one optical branch section is formed to branch one input-side optical waveguide at least into a first output-side optical waveguide terminal and a second output-side optical waveguide terminal. A light path length (L1) between the optical branch section and a next-stage optical branch section or the optical device is connected to the first output-side optical waveguide extending from the optical branch section and a light path length (L2) between the optical branch section and the next-stage optical branch section selected such that the absolute value of a difference between (L1) and (L2) is (¼+i/2) times (i is zero or a positive integer) the wavelength of the light transmitted through the light source circuit.

30 Claims, 30 Drawing Sheets

PHASE CONTROL STRUCTURE 20 ( | L₁ − L₂ | = (1/4+i/2) WAVELENGTH)

(51) Int. Cl.
   *G02F 1/313*   (2006.01)
   *G02B 6/42*   (2006.01)
   *G02F 1/225*   (2006.01)
   *G02F 1/01*   (2006.01)
   *G02B 6/28*   (2006.01)
   *G02B 6/12*   (2006.01)
   *G02F 1/21*   (2006.01)

(52) U.S. Cl.
   CPC ..... *G02B 6/2813* (2013.01); *G02B 2006/12142* (2013.01); *G02B 2006/12159* (2013.01); *G02F 1/0147* (2013.01); *G02F 2001/217* (2013.01)

(56) References Cited

FOREIGN PATENT DOCUMENTS

| JP | 2809517 | 7/1998 | ............. | G02B 6/122 |
| JP | 2003185867 | 7/2003 | ............. | G02B 6/122 |
| JP | 2008209899 | 9/2008 | ............. | G02B 6/122 |

OTHER PUBLICATIONS

International Search Report issued in corresponding application No. PCT/JP2013/005105, dated Apr. 2, 2013 (3 pgs).

Hashimoto et al., "Multichip optical hybrid integration technique with planar lightwave circuit platform", Journal of Lightwave Technology, vol. 16, pp. 1249-1258 (1998) (10 pgs).

Tsuchizawa et al., "Low-Loss Si Wire Waveguides and their Application to Thermooptic Switches", Japanese Journal of Applied Physics, vol. 45, pp. 6658-6662 (2006) (5 pgs).

Shoji et al., "Magneto-optical isolator with silicon waveguides fabricated by direct bonding", Applied Physics Letters, vol. 92, p. 071117 (2008) (3 pgs).

* cited by examiner

LIGHT SOURCE CIRCUIT AND LIGHT SOURCE DEVICE EQUIPPED WITH SAME

TECHNICAL FIELD

The present invention relates to a light source circuit which is used in optical communication, an optical interconnection, and the like, and in particular, to a light source circuit in which a branched optical waveguide is formed on a substrate, and light incident from a light source is transmitted to a plurality of optical devices, and a light source device equipped with the light source circuit.

BACKGROUND ART

Recently, the study on silicon photonics in which various optical devices are integrated on a silicon substrate has received extensive attention.

It is known that silicon is an indirect transition type material, and thus a light source with high energy efficiency is difficult to be realized using the silicon. On the other hand, a compound semiconductor such as GaAs (gallium arsenide) and InP (indium phosphide) is a direct transition type material, and thus a light source with high energy efficiency is able to be realized using the compound semiconductor. For this reason, as a method for integrating the light source on the silicon substrate, a method for integrating a compound semiconductor light source on the silicon substrate is considered as a superior method.

For example, as illustrated in FIG. 28, when a compound semiconductor laser diode is bonded on the silicon substrate as the light source by flip-chip bonding or the like, it is possible to integrate the light source with high energy efficiency on the silicon substrate (Non Patent Document 1).

Light from the compound semiconductor laser diode arranged as described above, for example, is delivered to an optical integrated circuit through a spot size converter, a silicon optical waveguide, or the like. In addition, in order to deliver the light from the compound semiconductor laser diode to a plurality of optical devices on the silicon substrate, a light source circuit including a branched optical waveguide as disclosed in Non Patent Document 2 is used.

As a representative example of the branched optical waveguide, a 1×2 multimode interference waveguide is illustrated in FIG. 29. The 1×2 multimode interference waveguide branches one input light into two output terminals. As illustrated in FIG. 30, when the one light ray is branched into a plurality of light rays by using the light source circuit including the branched optical waveguide, the light from the compound semiconductor laser diode is able to be effectively utilized. As the branched optical waveguide, it is preferable that a multi-stage branched optical waveguide with which the light is able to be distributed to a plurality of optical devices be used.

When the light from the light source such as the semiconductor laser diode is incident on the branched optical waveguide, reflection light is generated in a branch section. As the light source device illustrated in FIG. 30, when the semiconductor laser diode and the branched optical waveguide are combined to be operated, returning light with respect to the laser diode may be generated in the branched optical waveguide. When the returning light is incident on the laser diode, a variation in output intensity of the laser diode (that is, generation of an intensity noise) or a variation in emission wavelength (generation of a phase noise) is caused, and thus a problem of affecting an oscillation property occurs.

Thus, in the light source device of the related art using the semiconductor laser diode and the branched optical waveguide, a problem in which operation of the light source device is unstable due to the returning light from the branched optical waveguide exists.

In addition, as described above, it is preferable that the multi-stage branched optical waveguide be used as the branched optical waveguide such that the light is able to be distributed to the plurality of optical devices. However, in the multi-stage branched optical waveguide, when the number of stages of the branch section is increased in order to increase the number of distributed light rays, the reflection light is generated in the branch section of each stage, and thus a problem in which the intensity of the returning light is likely to be high occurs.

As one of methods for inhibiting the returning light, a method in which an optical isolator which uses a nonreciprocal phase shift effect according to a magneto-optical material (an effect in which a phase change amount received by the light is different according to a propagation direction) is used is suggested (Non Patent Document 3). In this method, an advantage by which the returning light is able to be effectively inhibited exists. However, it is necessary that a magnetic field be applied to the magneto-optical material in order to realize operation of the optical isolator, and thus a problem in which a device for generating a magnetic field has to be additionally disposed exists. In addition, since the magneto-optical material has a physical property which is substantially different from that of silicon, a problem in which the magneto-optical material is difficult to be integrated on the silicon substrate exists.

In addition, in order to solve the problem due to the returning light, the reflection light generated in the branched optical waveguide may be inhibited. As a method for reducing the reflection light generated in the branched optical waveguide, various methods are proposed.

For example, as disclosed in Patent Document 1 and Patent Document 2, a branched optical waveguide including a branch section of a special shape is proposed. However, even though the branched optical waveguide generates little reflection light in a theoretical design, a problem in which the reflection light according to a manufacturing error is not able to be prevented from being generated exists. In this case, it is possible to reduce the reflection light with an improvement of microfabrication precision, but enormous cost and rigorous process management are required in order to improve the microfabrication precision.

In addition, in the light source circuit as described above, a branched optical waveguide using silicon is commonly used as the branched optical waveguide because there is an advantage of enabling substantial downsizing compared to a branched optical waveguide using a quartz-based material. However, the branched optical waveguide using silicon has a critically large core-cladding refractive index difference, and thus has a drawback in which the reflection light is difficult to be reduced.

CITATION LIST

Patent Literature

Patent Document 1: Japanese Patent No. 2809517
Patent Document 2: JP-A-2003-185867

Non Patent Literature

Non Patent Document 1: T. Hashimoto et al., "Multichip optical hybrid integration technique with planar lightwave circuit platform", Journal of Lightwave Technology, vol. 16, pp. 1249-1258 (1998)

Non Patent Document 2: T. Tsuchizawa et al., "Low-Loss Si Wire Waveguides and their Application to Thermooptic Switches", Japanese Journal of Applied Physics, vol. 45, pp. 6658-6662 (2006)

Non Patent Document 3: Y. Shoji et al., "Magneto-optical isolator with silicon waveguides fabricated by direct bonding", Applied Physics Letters, vol. 92, p. 071117 (2008)

SUMMARY OF INVENTION

Technical Problem

By solving the problem of the related art, the present invention is to inhibit returning light from a branched optical waveguide from reaching a semiconductor laser diode in a light source circuit including the branched optical waveguide which branches light from the semiconductor laser diode into a plurality of light rays.

Solution to Problem

The problem described above is solved by the following light source circuit and light source device equipped with the same.

(1) A light source circuit in which at least one optical branch section for branching one input side optical waveguide into at least a first output side optical waveguide and a second output side optical waveguide is formed on a substrate, and light incident from a semiconductor laser light source is transmitted to a plurality of optical devices, in which a light path length $L_1$ of an optical waveguide between the optical branch section and a next-stage optical branch section or an optical device which is connected to the first output side optical waveguide extending from the optical branch section, and a light path length $L_2$ of an optical waveguide between the optical branch section and a next-stage optical branch section or an optical device which is connected to the second output side optical waveguide are selected such that an absolute value of a difference between the light path length $L_1$ and the light path length $L_2$ is (¼+i/2) times (i is 0 or a positive integer) a wavelength of the light propagated through the light source circuit.

(2) A light source circuit in which at least one optical branch section for branching one input side optical waveguide into at least a first output side optical waveauide and a second output side optical waveguide is formed on a substrate, and light incident from a semiconductor laser light source is transmitted to a plurality of optical devices, including:

a phase control structure for controlling a light path length in which a light path length $L_1$ of an optical waveguide between the optical branch section and a next-stage optical branch section or an optical device which is connected to the first output side optical waveguide extending from the optical branch section, and a light path length $L_2$ of an optical waveguide between the optical branch section and a next-stage optical branch section or an optical device which is connected to the second output side optical waveguide are controlled such that an absolute value of a difference between the light path length $L_1$ and the light path length $L_2$ is (¼+i/2) times (i is 0 or a positive integer) a wavelength of the light propagated through the light source circuit.

(3) The light source circuit according to (2), in which the phase control structure includes a dynamic phase control mechanism for dynamically adjusting the light path length.

(4) The light source circuit according to (3), in which the dynamic phase control mechanism is a phase modulator.

(5) The light source circuit according to (3), in which the dynamic phase control mechanism is a micro heater.

(6) The light source circuit according to any one of (1) to (5), in which a plurality of stages of the optical branch section is formed on the substrate.

(7) A light source circuit in which at least one optical branch section for sequentially branching one input side optical waveguide into at least a first output side optical waveguide, a second output side optical waveguide, a third output side optical waveguide, and a fourth output side optical waveguide is formed on a substrate, and light incident from a semiconductor laser light source is transmitted to a plurality of optical devices, in which the first to the fourth output side optical waveguides extend from the optical branch section to a next-stage optical branch section or the optical device, the first and the fourth output side optical waveguides, and the second and the third output side optical waveguides are paired, respectively, and a light path length is selected such that an absolute value of a difference between a light path length of one output side optical waveguide of each pair of output side optical waveguides of the optical branch section and a light path length of the other output side optical waveguide of each pair of output side optical waveguides of the optical branch section is (¼+i/2) times (i is 0 or an positive integer) a wavelength of the light transmitted through the light source circuit.

(8) The light source circuit according to anyone of (1) to (7), in which the optical branch section equally distributes the light to all of the output side optical waveguides.

(9) The light source circuit according to any one of (1) to (8), in which a directional coupler or a 2×2 multimode interference waveguide is disposed in a previous stage to the input side optical waveguide of the optical branch section.

(10) The light source circuit according to (9), in which a light path length $L_A$ from the first output side optical waveguide of the directional coupler or the 2×2 multimode interference waveguide to the next-stage optical branch section, and a light path length $L_B$ from the second output side optical waveguide of the directional coupler or the 2×2 multimode interference waveguide to the next-stage optical branch section are selected such that an absolute value of a difference between the light path length $L_A$ and the light path length $L_B$ is i/2 times (i is 0 or a positive integer) the wavelength of the light transmitted through the light source circuit.

(11) The light source circuit according to (9) or (10), in which an optical, monitor is connected to one input side optical waveguide of the directional coupler or the 2×2 multimode interference waveguide.

(12) The light source circuit according to any one of (1) to (11), in which the optical branch section includes a 1×N multimode interference waveguide or a 1×N Y branched optical waveguide (N is a positive integer of 2 or more).

(13) The light source circuit according to any one of (1) to (12), in which the substrate is a silicon substrate or an SOI substrate.

(14) A light source device, including:

a semiconductor laser light source; and the light source circuit according to anyone of (1) to (13), which is connected to the semiconductor laser light source.

(15) The light source device according to (14), in which the semiconductor laser light source includes a compound semiconductor laser diode or a compound semiconductor laser diode array.

Advantageous Effects of Invention

According to the present invention, the reflection light generated in the next-stage optical branch section or the optical device connected to the first output side optical waveguide of the previous-stage optical branch section, and the reflection light generated in the next-stage optical branch section or the optical device connected to the second output side optical waveguide of the previous-stage optical branch section are synthesized in the anti-phased state in the previous-stage optical branch section, and thus it is possible to effectively inhibit the returning light in the light source circuit which includes the branched optical waveguide for branching the light from the semiconductor laser diode light source into a plurality of light rays.

Accordingly, it is possible to inhibit the returning light with respect to the semiconductor laser diode from the branched optical waveguide, and thus the operation of the semiconductor laser diode light source is able to be stabilized.

DESCRIPTION OF EMBODIMENTS

Hereinafter, embodiments of the present invention will be described with reference to the drawings.

Figure 1:
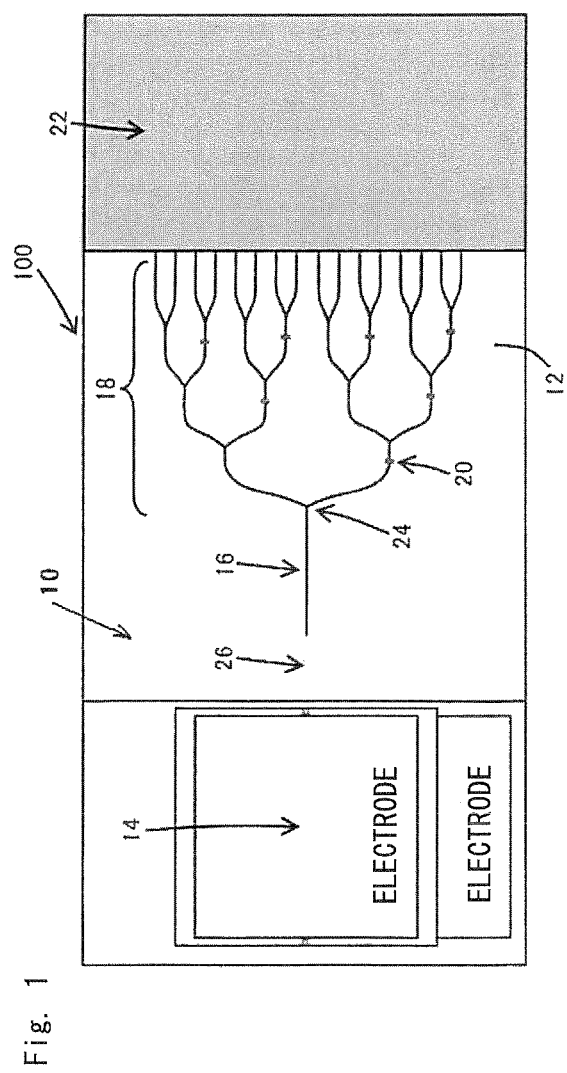
FIG. 1 is a plan view illustrating an entire configuration of a light source device according to the present invention which is provided with a semiconductor laser diode and a light source circuit including a branched optical waveguide.

FIG. 1 illustrates a light source device 100 provided with a light source circuit 10 according to the present invention. Referring to FIG. 1, the light source device 100 includes a semiconductor laser diode light source 14, and the light source circuit 10 formed on a device substrate 12. As the device substrate 12, for example, a silicon substrate or an SOI substrate may be used.

It is preferable that the semiconductor laser diode light source 14 be a compound semiconductor laser diode formed of a GaAs-based or an InP-based compound semiconductor.

The light source circuit 10 includes an introduced light waveguide 16, a branched optical waveguide 18, and a phase control structure 20.

Light from the semiconductor laser diode light source 14 is guided to the branched optical waveguide 18 through the introduced light waveguide 16, and the light guided to the branched optical waveguide 18 is distributed into a plurality of light rays and supplied to an optical device 22.

The introduced light waveguide 16 is any type of optical waveguide for guiding the light from the semiconductor laser diode light source 14 to the branched optical waveguide 18, and may be, for example, a silicon-based optical waveguide such as a silicon optical wire waveguide, a silicon rib optical waveguide, a polysilicon optical wire waveguide, a polysilicon rib optical waveguide, an amorphous silicon optical wire waveguide, an amorphous silicon rib optical waveguide, a SiON optical waveguide, a SiN optical waveguide, and a SiC optical waveguide. In addition, the introduced light waveguide 16 may be another optical waveguide such as a quartz-based optical waveguide, and a polymer optical waveguide.

In the branched optical waveguide 18, at least one optical branch section 24 for branching one input side waveguide into at least two output side waveguides is formed to distribute the input light into a plurality of lights.

It is preferable that the branched optical waveguide 18 be a multi-stage branched optical waveguide in which a plurality of stages of the optical branch section 24 is formed on the device substrate 12.

In addition, the branched optical waveguide 18 may be formed of, for example, a silicon-based material such as silicon, polysilicon, or amorphous silicon, and the optical branch section 24 may be a multimode interference waveguide or a Y-branched optical waveguide.

Here, the optical branch section 24 may be another type of branched optical waveguide such as a directional coupler, and it is indisputable that the branched optical waveguide 18 and the optical branch section 24 may be formed of other material such as a silicon-based material such as SiON, SiN, and SiC, a quartz-based material, and a polymer-based material.

The phase control structure 20 is a unit for controlling a phase of the propagated light by controlling a light path length from a previous-stage optical branch section 24 of the branched optical waveguide 18 to an input terminal of a next-stage optical branch section 24 or the optical device 22, and is introduced to an optical waveguide connecting an output terminal of the previous-stage optical branch section 24 and the input terminal of the next-stage optical branch section 24 or the optical device 22 in the branched optical waveguide 18.

The light source circuit 10 may further include a spot size converter 26 arranged between the semiconductor laser diode light source 14 and the introduced light waveguide 16. By using the spot size converter 26, the light from the semiconductor laser diode light source 14 is able to be efficiently guided to the introduced light waveguide 16. As the spot size converter 26, for example, a structure or the like in combination with an inverse tapered silicon optical waveguide, a forward tapered silicon optical waveguide, or an inverse tapered silicon optical waveguide, and a SiON optical waveguide or a polymer optical waveguide may be used. Here, the inverse or the forward tapered structure may be disposed in the SiON optical waveguide or the polymer optical waveguide.

Figure 2:
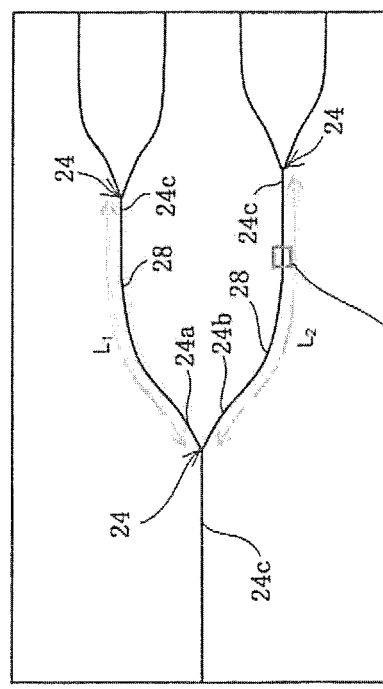
FIG. 2 is an enlarged view illustrating a phase control structure which is introduced to the branched optical waveguide of the light source circuit illustrated in FIG. 1.

Next, the phase control structure 20 which is a characteristic of the present invention will be described in detail with reference to FIG. 2. In the branched optical waveguide illustrated in FIG. 2, the next-stage optical branch section 24 is cascadingly connected to each of two output terminals (a first output terminal 24$a$ and a second output terminal 24$b$) of the previous-stage optical branch section 24 through the optical waveguide. The multi-stage branched optical waveguide 18 as illustrated in FIG. 1 is formed by repeating a structure of cascadingly connecting two optical branch sections 24 in this manner.

As each optical branch section 24, the multimode interference waveguide or the Y-branched optical waveguide as described above may be used. For example, when a 1×2 multimode interference waveguide or the Y-branched optical waveguide is used as each optical branch section 24, the light incident on each of the optical branch sections 24 is able to be distributed into two optical waveguides by 50%.

The phase control structure 20 is introduced to any one of the optical waveguides connected to the two output terminals 24$a$ and 24$b$ of the previous-stage optical branch section 24. The phase control structure 20 sets an absolute value $|L_1-L_2|$ of a difference between a light path length $L_1$ from one output terminal (the first output terminal 24$a$) of the previous-stage optical branch section 24 to an input terminal 24$c$ of the next-stage optical branch section 24 along the optical waveguide 28, and a light path length $L_2$ from the other output terminal (the second output terminal 24$b$) of the previous-stage optical branch section 24 to an input terminal 24$c$ of the next-stage optical branch section 24 to $(\frac{1}{4}+i/2)\lambda$ ($i=0, 1, 2, \ldots$). Here, $\lambda$ indicates a wavelength of the light propagated through the light source circuit.

Figure 3:
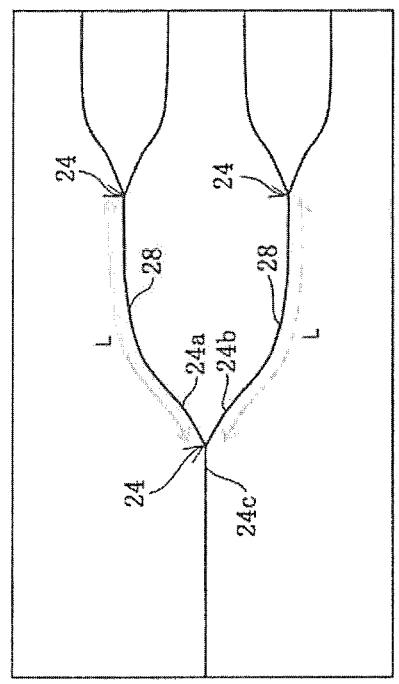
FIG. 3 is an explanatory view illustrating an example of a branched optical waveguide of the related art.

For example, the multi-stage branched optical waveguide 18 which satisfies $|L_1-L_2|=(\frac{1}{4}+i/2)\lambda$ is construed as the following. First, as illustrated in FIG. 3, the branched optical waveguide is designed in which two optical waveguides 28 which satisfy $L_1=L_2=L$ are connected to the first output terminal 24$a$ and the second output terminal 24$b$ of the previous-stage optical branch section 24. Next, as the phase control structure 20, the optical waveguide of the light path length $(\frac{1}{4}+i/2)\lambda$ is introduced to one of the two optical waveguides 28 connected to the previous-stage optical branch section 24, and thus the branched optical waveguide is formed as illustrated in FIG. 2. According to such an introduction of the phase control structure 20, a condition of $|L_1-L_2|=(\frac{1}{4}+i/2)\lambda$ is satisfied.

Next, a principle of inhibiting the returning light by introducing the phase control structure 20 as described above will be described. Here, for the sake of simplicity, the principle will be described by using the two-stage branched optical waveguide (a four-branched optical waveguide).

Figure 4:
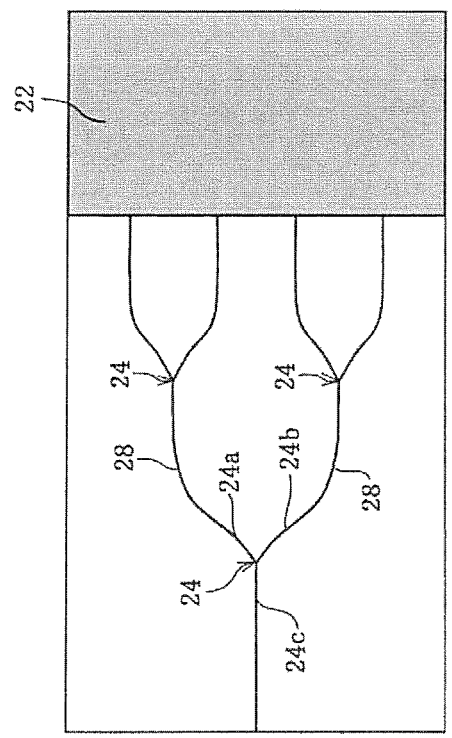
FIG. 4 is an explanatory view illustrating a two-stage branched optical waveguide of the related art to which the phase control structure is not introduced.

The two-stage branched optical waveguide is realized by performing a two-stage cascade connection of the optical branch section 24 as illustrated in FIG. 4, that is, by connecting two next-stage optical branch sections 24 to each of the first output terminal 24a and the second output terminal 24b of one previous-stage optical branch section 24 through the optical waveguide 28.

In the two-stage branched optical waveguide illustrated in FIG. 4, reflection light is generated in each of one first stage optical branch section 24, and two second stage optical branch sections 24. The reflection light generated in the two second stage optical branch sections 24 returns to the input terminal 24c of the first stage optical branch section 24 through each of the first output terminal 24a and the second output terminal 24b of the first stage optical branch section 24. Therefore, the returning light of the two-stage branched optical waveguide illustrated in FIG. 4 is the reflection light generated in the one first stage optical branch section 24 and the reflection light generated in the two second stage optical branch sections 24 overlapping each other.

Here, when the reflection light generated in the first stage optical branch section 24 and the reflection light generated in the second stage optical branch section 24 are strongly overlapped, the returning light is maximum. In this case, when an amplitude reflectance of each of the optical branch sections 24 is set to R ($\ll$1), an amplitude reflectance of two-stage branch section optical waveguide, that is, an amplitude reflectance corresponding to the returning light is able to be approximately indicated by R+R=2R. Further, since an energy reflectance is indicated by the square of the amplitude reflectance, an energy reflectance of the two-stage branched optical waveguide, that is, an energy reflectance corresponding to the returning light is able to be approximately indicated by $4R^2$.

The energy reflectance of the two-stage branched optical waveguide is $4R^2$ in the worst state as described above, compared to an energy reflectance corresponding to the returning light of the one-stage branched optical waveguide (a two-branched optical waveguide) which is $R^2$, and thus it is understood that the energy reflectance of the two-stage branched optical waveguide is 4 times the energy reflectance of the one-stage branched optical waveguide. Similarly, when using an N-stage branched optical waveguide, the energy reflectance corresponding to the returning light is $N^2R^2$ in the worst state, and thus the energy reflectance of the N-stage branched optical waveguide is $N^2$ times the energy reflectance of the one-stage branched optical waveguide. Therefore, in a multi-stage branched optical waveguide of the related art to which the phase control structure 20 is not introduced, a problem in which the worst value of the returning light increases in proportion to the square of the number of stages of the optical branch section 24 exists.

First Embodiment of Light Source Circuit

Figure 5:
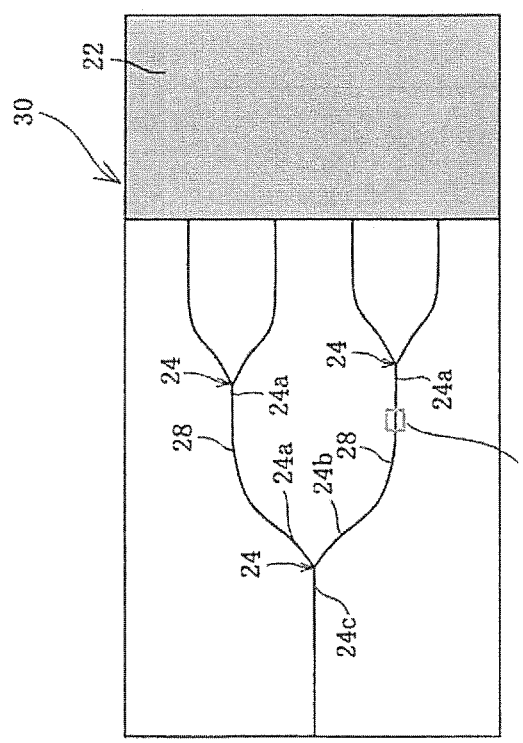
FIG. 5 is a schematic view illustrating a two-stage branched optical waveguide to which the phase control structure is introduced as a first embodiment of the light source circuit according to the present invention.

In this regard, the returning light of the two-stage branched optical waveguide 30 according to the present invention to which the phase control structure 20 including the optical waveguide of the light path length of $\lambda/4$ is introduced as illustrated in FIG. 5 is considered. In the two-stage branched optical waveguide 30 to which the phase control structure 20 is introduced, the reflection light is generated in the one first stage optical branch section 24, and the two second stage optical branch sections 24, and the reflection light generated in the two second stage optical branch sections 24 returns to the input terminal 24c of the first stage optical branch section 24 through each of the first output terminal 24a and the second output terminal 24b of the first stage optical branch section 24.

Here, the optical waveguide of the light path length of $\lambda/4$ is introduced to any one of the optical waveguides 28 connected to each of the first output terminal 24a and the second output terminal 24b of the first stage optical branch section 24 (in FIG. 5, the optical waveguide 28 connected to the second output terminal 24b) as the phase control structure 20.

Accordingly, two lights which are propagated through the two optical waveguides 28 extending between the first stage optical branch section 24 and the second stage optical branch section 24 generate a difference of the light path length of $\lambda/2$ in reciprocation. For this reason, the reflection light incident on the first output terminal 24a and the second output terminal 24b of the first stage optical branch section 24 is in an anti-phased state where the phases are different from each other by 180 degrees.

Thus, when anti-phased light is incident on the two output terminals 24a and 24b of the optical branch section 24, the lights interfere with each other to cancel each other out, and are not able to be coupled to the input terminal 24c, and thus the reflection light generated in the second stage optical branch section 24 does not contribute to the returning light. Therefore, with the introduction of the phase control structure 20, it is possible to completely inhibit the returning light caused by the second stage optical branch section 24.

Thus, in the light source circuit 10 according to the present invention, the phase control structure 20 is included, and thus even when the reflection light is generated in a subsequent-stage optical branch section 24, the reflection light returned to the first output terminal 24a of the previous-stage optical branch section 24 and the reflection light returned to the second output terminal 24b of the previous-stage optical branch section 24 are in the anti-phased state (that is, in a state where the phases are shifted by 180 degrees), and thus interfere with each other to cancel each other out at the time of being overlapped in the previous-stage optical branch section 24. Therefore, an effect of inhibiting the returning light is obtained.

In addition, even when the present invention is applied to the light source circuit 10 of another structure such as a light source circuit provided with a multi-stage branched optical waveguide of three or more stages or a branched optical waveguide including an optical branch section which branches light into three or more optical waveguides, it is possible to obtain the same effect.

Hereinafter, various types of branched optical waveguides 18 which are able to obtain an inhibitive effect on the returning light by introducing the phase control structure 20 according to the present invention will be described.

Second Embodiment of Light Source Circuit

Figure 6:
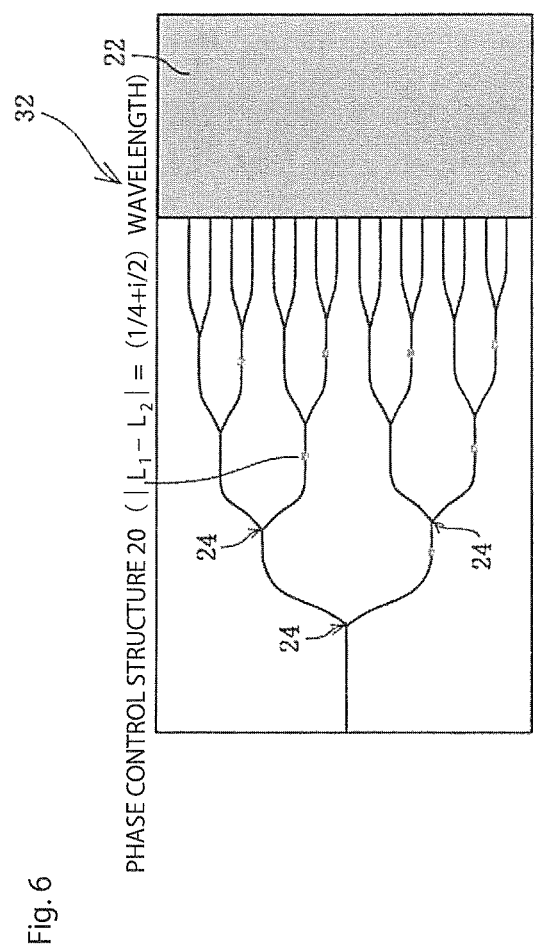
FIG. 6 is a schematic view illustrating a four-stage branched optical waveguide to which the phase control structure is introduced as a second embodiment of the light source circuit according to the present invention.

A multi-stage branched optical waveguide of three or more stages is able to be realized by simply performing the cascade connection with respect to the branched optical waveguide. In FIG. 6, the light source circuit including a four-stage branched optical waveguide 32 (a 16-branched optical waveguide) to which the phase control structure is introduced is illustrated. In the multi-stage branched optical waveguide 32 of three or more stages, according to the same principle as in the two-stage branched optical waveguide 30 described above, it is possible to completely inhibit the returning light caused by the optical branch section 24 after the second stage.

Thus, in the multi-stage branched optical waveguide 18 to which the phase control structure 20 is introduced, the reflection light from the optical branch section 24 after the second stage does not contribute to the returning light, and in the two-stage branched optical waveguide 30 or the multi-stage branched optical waveguide 32 of three or more stages to which the phase control structure 20 is introduced, an energy reflectance value corresponding to the returning light is $R^2$ as is the case of the one-stage branched optical waveguide.

That is, in the multi-stage branched optical waveguide of the related art, the problem in which the worst value of the returning light increases in proportion to the square of the number of stages of the optical branch section 24 exists, but in the multi-stage branched optical waveguide 18 to which the phase control structure 20 is introduced, the returning light does not increase according to the number of stages as described above. Therefore, when the phase control structure 20 is introduced to the multi-stage branched optical waveguide 18, it is possible to freely select the number of stages of the optical branch section 24 at the time of designing the device.

In addition, as described above, the energy reflectance value corresponding to the returning light of a case of the two-stage branched optical waveguide 30 or the multi-stage branched optical waveguide 32 of three or more stages to which the phase control structure 20 is introduced is identical to the case of the one-stage branched optical waveguide, and thus when the amplitude reflectance of the first stage optical branch section is set to $R_1$, and the amplitude reflectance of the optical branch section after the second stage is set to $R_2$, $R_3$, ..., and the energy reflectance value corresponding to the returning light in the multi-stage branched optical waveguide 18 is approximately indicated by $R_1^2$.

That is, in the multi-stage branched optical waveguide 18, the energy reflectance corresponding to the returning light is determined by the amplitude reflectance of the first stage optical branch section 24, and thus it is possible to considerably inhibit the returning light as the amplitude reflectance of the first stage optical branch section 24 decreases.

In the multi-stage branched optical waveguide of the related art, in order to inhibit the returning light, the amplitude reflectance of the entire optical branch section 24 has to be decreased. On the other hand, when the phase control structure 20 is introduced according to the present invention, it is possible to easily inhibit the returning light.

In addition, when the phase control structure 20 is introduced, the reflection light from the optical branch section 24 after the second stage does not contribute to the returning light in the multi-stage branched optical waveguide 18, and thus the optical branch section 24 of which the amplitude reflectance is relatively high is allowed to be used insofar as the stage is after the second stage.

For example, it is possible to use the optical branch section 24 of which the amplitude reflectance is low in the first stage, and to use the optical branch section 24 of which the amplitude reflectance is relatively high in the stage after the second stage. In this case, the optical branch section 24 for which the amplitude reflectance is required to be low may be only in the first stage, and all the other optical branch sections may be the optical branch section 24 of which the amplitude reflectance is relatively high. In addition, the optical branch section 24 is able to be downsized as an acceptable amplitude reflectance becomes higher.

Therefore, when the phase control structure 20 is introduced, an ultracompact optical branch section 24 is able to be arranged in the stage after the second stage, and thus it contributes to the downsizing of the light source circuit 10 in addition to the inhibition of the returning light.

Furthermore, in the embodiment described above, a case where the phase control structure 20 is introduced between the previous-stage optical branch section 24 and the subsequent-stage optical branch section 24 in order to inhibit the returning light due to the reflection light generated in the optical branch section 24 is illustrated, but the phase control structure 20 may be introduced between the previous-stage optical branch section 24 and a subsequent-stage optical device 22 connected to the previous-stage optical branch section 24, and thus the returning light caused by the optical device may be inhibited.

Third Embodiment of Light Source Circuit

The light propagated through the optical waveguide 28 has a property of being reflected in a portion where the structure is changed. For this reason, the reflection light may be generated in a connection portion between the optical waveguide 28 and the optical device 22. Thus, in order to inhibit the returning light caused by the optical device 22, the phase control structure 20 may be introduced between the optical device 22 and the previous-stage optical branch section 24 thereof as illustrated in FIG. 7.

For example, in this case, the phase control structure 20 may be an optical waveguide of a length for satisfying $|L_1-L_2|=(¼+i/2)\lambda$ (i=0, 1, 2, ...) when the light path lengths of the optical waveguide 28 between the input terminal of the optical device 22 and the two output terminals 24a and 24b of the previous-stage optical branch section 24 of the optical device are set to $L_1$ and $L_2$. Accordingly, it is possible to inhibit the returning light caused by the optical device 22. Such an effect is not able to be realized by the concept of the related art in which the returning light is inhibited by decreasing the reflection light in the optical branch section.

Fourth Embodiment of Light Source Circuit

Figure 7:
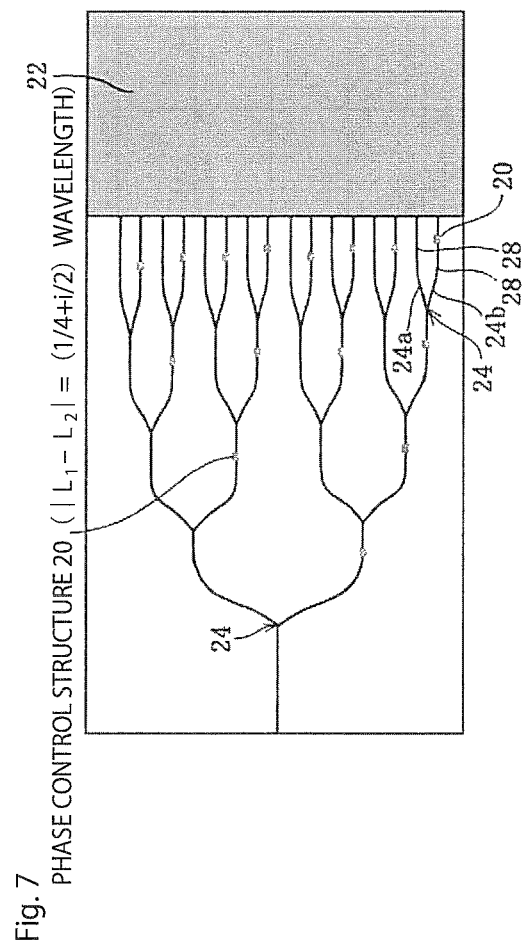
FIG. 7 is a schematic view illustrating the light source circuit in which the phase control structure is introduced between a multi-stage branched optical waveguide and an optical integrated circuit as a third embodiment of the light source circuit according to the present invention.
Figure 8:
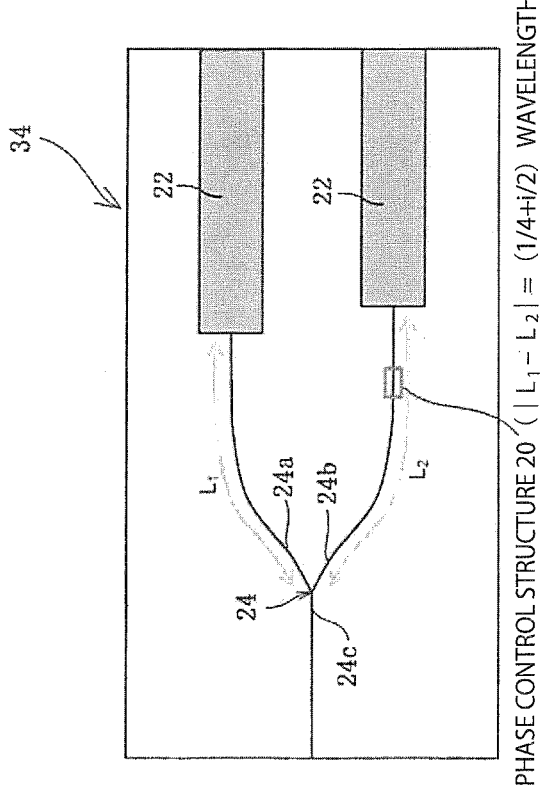
FIG. 8 is a schematic view illustrating a one-stage branched optical waveguide to which the phase control structure is introduced as a fourth embodiment of the light source circuit according to the present invention.

In addition, in the embodiment illustrated in FIG. 5 to FIG. 7, a case where the multi-stage branched optical waveguides 18, 30, and 32 in which the two or more stages of optical branch sections 24 are cascadingly connected are used is illustrated, but the present invention may be applied to a case where a one-stage branched optical waveguide 34, that is, a branched optical waveguide 34 including only one optical branch section 24 is used as illustrated in FIG. 8, and it is indisputable that the same effect is able to be obtained.

Here, in the description of the embodiment described above, a condition of $|L_1-L_2|=(¼+i/2)\lambda$ (1=0, 1, 2, ...) is satisfied by the phase control structure 20. Here, when a case in which an emission wavelength of the semiconductor laser diode light source 14 is shifted from a designed value according to an influence of a temperature change or the like is considered, a case of i=0 is preferable since the returning light is able to be maximally inhibited at the time of i=0. Hereinafter, the reason will be described.

First, a case where the emission wavelength of the semiconductor laser diode light source 14 is identical to the designed value is considered. The condition of $|L_1-L_2|=(¼+i/2)\lambda$ (i=0, 1, 2, ...) is satisfied by the phase control structure 20. When the light reciprocates such an optical waveguide, a light path difference in the reciprocation is $2|L_1-L_2|=(½+i)\lambda$.

Here, when a phase amount corresponding to $2|L_1-L_2|$ is set to θ, it is possible to indicate as $\theta=(2\pi/\lambda)\times 2|L_1-L_2|=\pi(1+2i)$. That is, according to the light path difference in the reciprocation $2|L_1-L_2|$, the anti-phase state in which the phases are different from each other by 180° is formed.

Next, a case where the emission wavelength of the semiconductor laser diode light source 14 is shifted from the designed value according to the influence of the temperature change or the like, and the wavelength of the light is changed to $\lambda+\Delta\lambda$ is considered. When the phase amount corresponding to the light path difference in the reciprocation $2|L_1-L_2|$ is set to $\theta+\Delta\theta$, it is possible to indicate as $\theta+\Delta\theta=(2\pi/(\lambda+\Delta\lambda))\times 2|L_1-L_2|=\pi(1+2i)(\lambda/(\lambda+\Delta\lambda))$, and a phase change amount $\Delta\theta$ is indicated as $\Delta\theta=\pi(1+2i)(\lambda/(\lambda+\Delta\lambda))-\pi(1+2i)=-\pi(1+2i)(\Delta\lambda/(\lambda+\Delta\lambda))$. However, here, for the sake of simplicity, wavelength dependency of an effective refractive index of an optical waveguide is not considered.

According to the formula described above, a shift $\Delta\theta$ from the designed value of the phase amount is minimum at the time of i=0. That is, when the emission wavelength of the semiconductor laser diode light source 14 is shifted from the designed value according to the influence of the temperature change or the like, the phase control structure 20 at the time of i=0 is able to maximally inhibit the returning light. Accordingly, in general, it is preferable that the phase control structure 20 have a structure for satisfying the condition of $|L_1-L_2|=\lambda/4$. However, in consideration of a restriction of an arrangement of each optical branch section 24, or the like, the phase control structure 20 may have a structure for satisfying the condition of $|L_1-L_2|=(\frac{1}{4}+i/2)\lambda$ (i=1, 2, . . . ) other than the case of i=0.

Fifth Embodiment of Light Source Circuit

Figure 9:
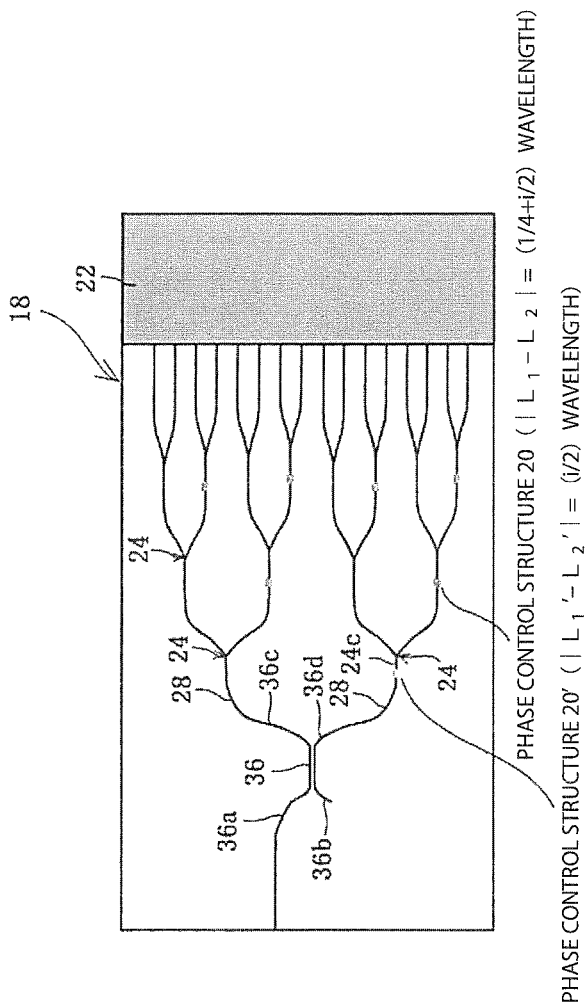
FIG. 9 is a schematic view illustrating the multi-stage branched optical waveguide in combination with a directional coupler in addition to the phase control structure as a fifth embodiment of the light source circuit according to the present invention.

FIG. 9 illustrates the light source circuit in which the directional coupler 36 is combined with a previous stage of the multi-stage branched optical waveguide 18. Usually, the directional coupler 36 has a characteristic that the amplitude reflectance is low. Accordingly, when the directional coupler 36 is used in the previous stage of the multi-stage branched optical waveguide 18, the amplitude reflectance $R_1$ of the first stage optical branch section is able to be low, and thus it is possible to effectively inhibit the returning light caused by the multi-stage branched optical waveguide.

The directional coupler 36 illustrated in FIG. 9 includes a first input terminal 36a and a second input terminal 36b, and a first output terminal 36c and a second output terminal 36d. Then, the introduced light waveguide 16 is connected to the first input terminal 36a, and the multi-stage branched optical waveguide 18 is connected to each of the first output terminal 36c and the second output terminal 36d through the optical waveguide 28. In addition, a phase control structure 20' is introduced to any one of the optical waveguides 28 (in FIG. 9, the optical waveguide 28 connected to the second output terminal 36d) connected to the first output terminal 36c and the second output terminal 36d of the directional coupler 36.

The phase control structure 20' may be an optical waveguide of a length with which an absolute value $|L_1'-L_2'|$ of a difference between a light path length $L_1'$ from the first output terminal 36c of the directional coupler 36 to the input terminal 24c of the next-stage optical branch section 24 along the optical waveguide 28 connected to the first output terminal 36c, and a light path length $L_2'$ from the second output terminal 36d of the directional coupler 36 to the input terminal 24c of the next-stage optical branch section 24 along the optical waveguide 28 connected to the second output terminal 36d is set to $(i/2)\lambda$ (i=0, 1, 2, 3, . . . ). Since an operating principle of the directional coupler 36 is different from an operating principle of the optical branch section 24 such as the multimode interference waveguide or the Y-branched optical waveguide, the phase control structure 20' is different from the phase control structure 20 which is introduced to the subsequent stage of the optical branch section 24 such as the multimode interference waveguide or the Y-branched optical waveguide.

At the time of using such a directional coupler 36, when phase control is suitably performed, the light incident on the first input terminal 36a of the directional coupler 36 is distributed to the first output terminal 36c and the second output terminal 36d, whereas the reflection light generated in the next-stage optical branch section 24 connected to the first output terminal 36c and the second output terminal 36d is emitted to the second input terminal 36b through the first output terminal 36c and the second output terminal 36d. Therefore, it is possible to inhibit the returning light caused by the branched optical waveguide 18.

Furthermore, when the directional coupler 36 is used, the phase control structure 20' which is introduced to the optical waveguide 28 connected to the subsequent stage of the directional coupler 36 is the optical waveguide of the length for satisfying $|L_1'-L_2'|=(i/2)\lambda$ (i=0, 1, 2, . . . ), and in consideration of a case where the emission wavelength of the semiconductor laser diode light source 14 is shifted from the designated value according to the influence of the temperature change or the like, the phase control structure 20' at the time of i=0 is able to maximally inhibit the returning light as is the case of the optical branch section 24.

Figure 10:
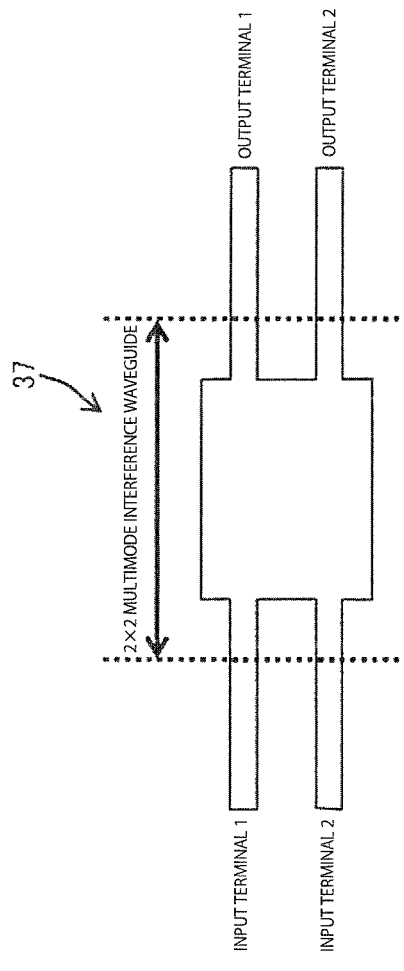
FIG. 10 is an explanatory view illustrating a 2×2 multi-mode interference waveguide of the related art.

Further, in FIG. 9, when a 2×2 multimode interference waveguide 37 illustrated in FIG. 10 is used instead of the directional coupler 36, the same operation and the same effect are realized.

In the embodiment described above, an example of using the two-branched optical branch section 24 which distributes the input light to two optical waveguides is illustrated. However, the present invention is able to be applied to an N-branched optical branch section which distributes the input light to N (N=3, 4, 5, . . . ) optical waveguides 28 as the optical branch section 24. For example, the phase control structure 20 is able to be introduced to the multi-stage branched optical waveguide using a 1×N multimode interference waveguide or a 1×N Y-branched optical waveguide as the optical branch section 24.

Figure 11:
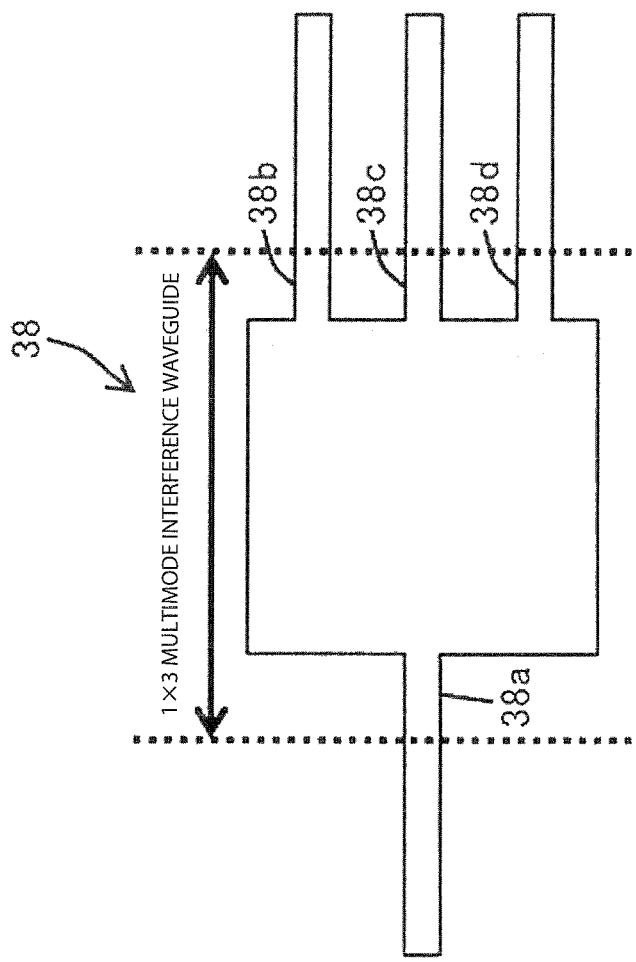
FIG. 11 is an explanatory view illustrating a 1×3 multi-mode interference waveguide of the related art.
Figure 12:
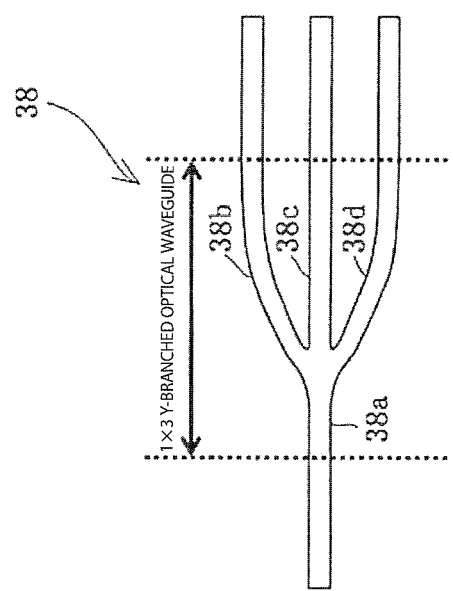
FIG. 12 is an explanatory view illustrating a 1×3 Y-branched optical waveguide of the related art.

As an example of a three-branched optical branch section 38, a 1×3 multimode interference waveguide is illustrated in FIG. 11, and a 1×3 Y-branched optical waveguide is illustrated in FIG. 12. The 1×3 multimode interference waveguide illustrated in FIG. 11 includes one input terminal 38a and three output terminals (a first output terminal 38b, a second output terminal 38c, and a third output terminal 38d), and distributes the light input to the input terminal 38a into the first output terminal 38b, the second output terminal 38c, and the third output terminal 38d.

Similarly, the 1×3 type Y-branched optical waveguide illustrated in FIG. 12 includes one input terminal 38a and three output terminals (a first output terminal 38b, a second output terminal 38c, and a third output terminal 38d), and distributes the light input to the input terminal 38a into the first output terminal 38b, the second output terminal 38c, and the third output terminal 38d.

Sixth Embodiment of Light Source Circuit

Figure 13:
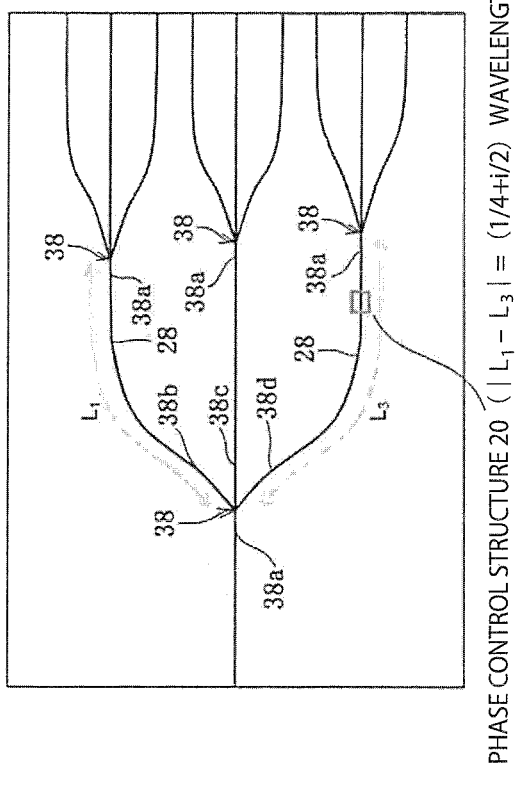
FIG. 13 is a schematic view illustrating the multi-stage branched optical waveguide in combination with a three-branched optical branch section and the phase control structure as a sixth embodiment of the light source circuit according to the present invention.

FIG. 13 illustrates an embodiment of a multi-stage branched optical waveguide 40 using the three-branched optical branch section 38. In the multi-stage light branched optical waveguide 40 illustrated in FIG. 13, the phase control structure 20 is introduced to the optical waveguide 28 extending between the third output terminal 38d of a first stage optical branch section 38 and the input terminal 38a of a second stage optical branch section 38 connected to the third output terminal 38d, and the introduced phase control structure 20 controls an absolute value $|L_1-L_3|$ of a difference between a light path length $L_1$ from the first output terminal 38b of the first stage optical branch section 38 to the input terminal 38a of the second stage optical branch section 38 along the optical waveguide 28 connected to the first output terminal 38b, and a light path length $L_3$ from the third output terminal 38d of the first stage optical branch section 38 to the input terminal 38a of the second stage optical branch section 38 along the optical waveguide 28 connected to the third output terminal 38d to be $(\frac{1}{4}+i/2)\lambda$ (i=0, 1, 2, . . . ).

In the multi-stage branched optical waveguide 40 illustrated in FIG. 13, even when the reflection light is generated in the second stage three-branched optical branch section 38, the reflection light incident on the first output terminal 38b and the reflection light incident on the third output terminal 38d of the first stage three-branched optical branch section 38 are in the anti-phased state, and cancel each other out, and thus are not able to be combined in the input terminal 38a of the first stage three-branched optical branch section 38.

Accordingly, the reflection light generated in the second stage optical branch section 38 connected to the first stage first output terminal 38b and the third output terminal 38d does not contribute to the returning light. Therefore, when the phase control structure 20 is introduced according to the present invention, it is possible to effectively inhibit the returning light in the multi-stage branched optical waveguide 40 using the three-branched optical branch section 38.

Figure 14:
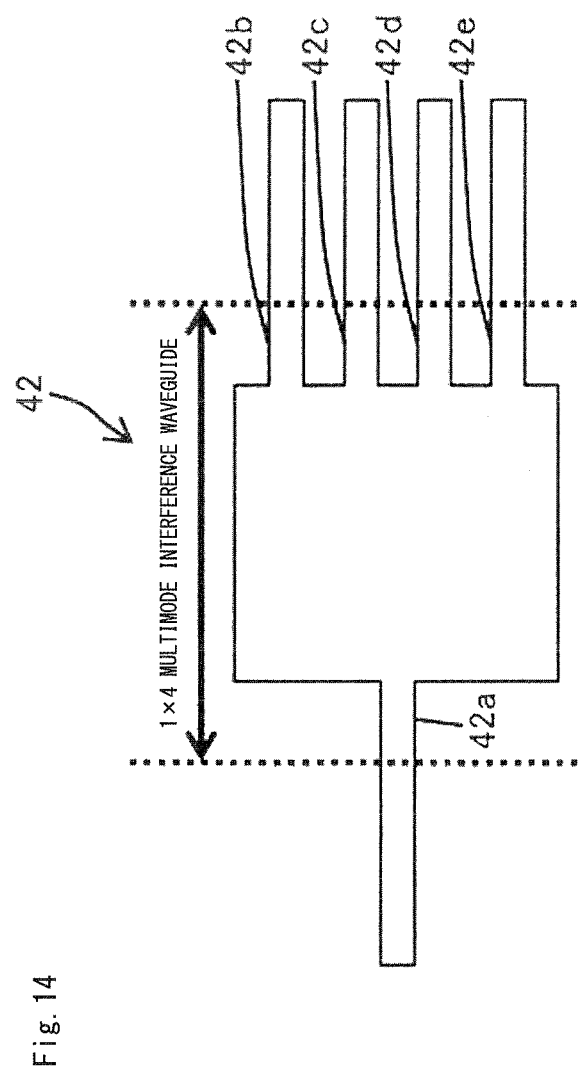
FIG. 14 is an explanatory view illustrating a 1×4 multi-mode interference waveguide of the related art.

FIG. 14 illustrates a 1×4 multimode interference waveguide as an example of a four-branched optical branch section 42. The 1×4 multimode interference waveguide includes one input terminal 42a and four output terminals (a first output terminal 42b, a second output terminal 42c, a third output terminal 42d, and a fourth output terminal 42e), and distributes the light input to the input terminal 42a into the first output terminal 42b, the second output terminal 42c, the third output terminal 42d, and the fourth output terminal 42e.

Seventh Embodiment of Light Source Circuit

Figure 15:
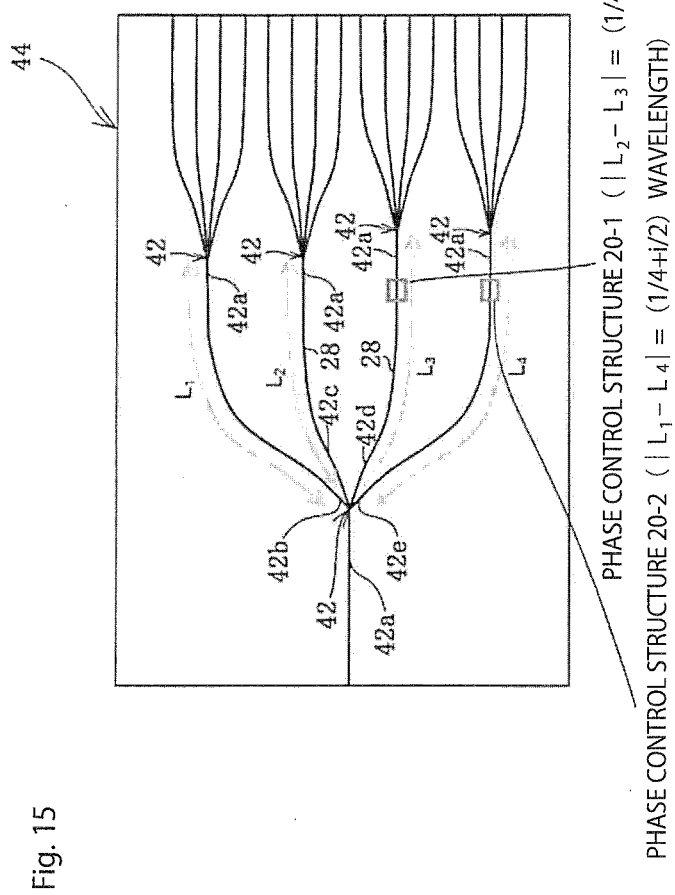
FIG. 15 is a schematic view illustrating the multi-stage branched optical waveguide in combination with a four-branched optical branch section and the phase control structure as a seventh embodiment of the light source circuit according to the present invention.

FIG. 15 illustrates an embodiment of a branched optical waveguide 44 using the four-branched optical branch section 42. In the branched optical waveguide 44 illustrated in FIG. 15, a first phase control structure 20-1 is introduced to the optical waveguide 28 extending between the third output terminal 42d of a first stage optical branch section 42 and the input terminal 42a of a second stage optical branch section 42 connected to the third output terminal 42d, and a second phase control structure 20-2 is introduced to the optical waveguide 28 extending between the fourth output terminal 42e of the first stage optical branch section 42 and the input terminal 42a of the second stage optical branch section 42 connected to the fourth output terminal 42e.

The first phase control structure 20-1 controls an absolute value $|L_2-L_3|$ of a difference between a light path length $L_2$ from the second output terminal 42c of the first stage optical branch section 42 to the input terminal 42a of the second stage optical branch section 42 along the optical waveguide 28 connected to the second output terminal 42c, and a light path length $L_3$ from the third output terminal 42d of the first stage optical branch section 42 to the input terminal 42a of the second stage optical branch section 42 along the optical waveguide 28 connected to the third output terminal 42d to be $(\frac{1}{4}+i/2)\lambda$ (i=0, 1, 2, . . . ), and the second phase control structure 20-2 controls an absolute value $|L_1-L_4|$ of a difference between a light path length $L_1$ from the first output terminal 42b of the first stage optical branch section 42 to the input terminal 42a of the second stage optical branch section 42 along the optical waveguide 28 connected to the first output terminal 42b, and a light path length $L_4$ from the fourth output terminal 42e of the first stage optical branch section 42 to the input terminal 42a of the second stage optical branch section 42 along the optical waveguide 28 connected to the fourth output terminal 42e to be $(\frac{1}{4}+i/2)\lambda$ (i=0, 1, 2, . . . ).

In the branched optical waveguide 44 illustrated in FIG. 15, even when the reflection light is generated in the second stage four-branched optical branch section 42, the reflection light incident on the first output terminal 42b and the reflection light incident on the fourth output terminal 42e of the first stage four-branched optical branch section 42 are in the anti-phased state, and cancel each other out, and thus are not able to be combined in the input terminal 42a of the first stage four-branched optical branch section 42.

Similarly, the reflection light incident on the second output terminal 42c and the reflection light incident on the third output terminal 42d of the first stage four-branched optical branch section 42 are not able to be combined in the input terminal 42a of the first stage four-branched optical branch section 42.

Accordingly, the reflection light generated in the second stage optical branch section 42 does not contribute to the returning light. Therefore, when the phase control structures 20-1 and 20-2 are introduced according to the present invention, it is possible to effectively inhibit the returning light in the branched optical waveguide 44 using the four-branched optical branch section 42.

By the same principle, when the phase control structure 20 is introduced according to the present invention, it is possible to effectively inhibit the returning light in the branched optical waveguide using an N-branched optical branch section (N=5, 6, 7, . . . ).

In this regard, the present invention is able to effectively and maximally inhibit the returning light when the number of branches of the optical branch section is an even number. For example, when the three-branched optical branch section 38 illustrated in FIG. 13 is used, the returning light caused by the reflection light which is generated in the second stage optical branch section 38 connected to the first output terminal 38b and the second stage optical branch section 38 connected to the third output terminal 38d is able to be sufficiently inhibited, but the returning light caused by the reflection light which is generated in the second stage optical branch section 38 connected to the second output terminal 38c is not able to be sufficiently inhibited.

Furthermore, in the embodiment illustrated in FIG. 13 and FIG. 15, the optical branch section 38 or 42 is connected in the second stage, but the optical device 22 may be connected instead of the optical branch section 38 or 42, and even in this case, the same effect is obtained.

Eighth Embodiment of Light Source Circuit

Figure 16:
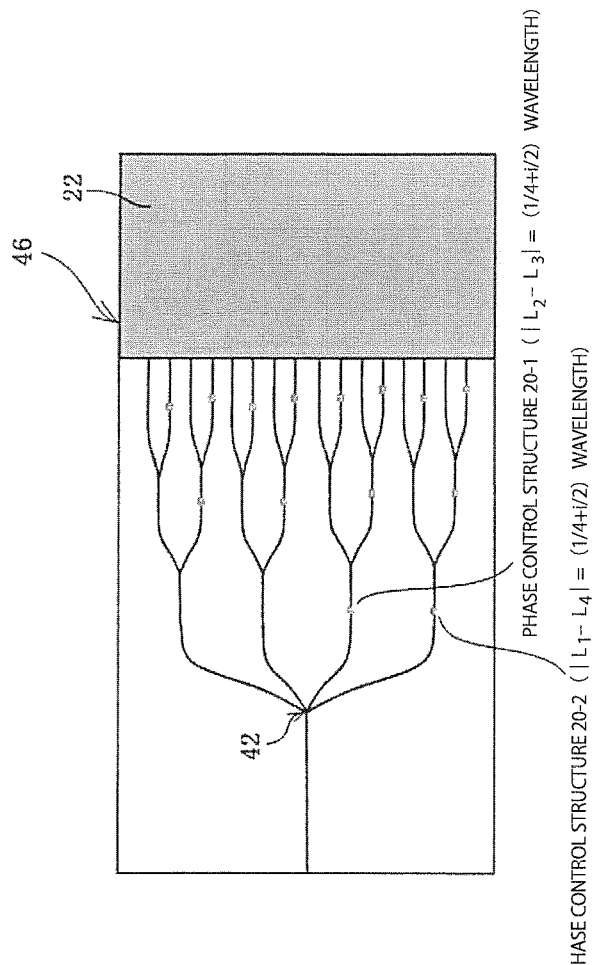
FIG. 16 is a schematic view illustrating the light source circuit in which the phase control structure is introduced to the multi-stage branched optical waveguide which is configured by a combination of a two-branched optical branch section and the four-branched optical branch section as an eighth embodiment of the light source circuit according to the present invention.

Further, the present invention is able to be applied to a multi-stage branched optical waveguide which is configured by freely combining the optical branch sections with different number of branches. For example, as illustrated in FIG. 16, the phase control structures 20-1 and 20-2 are able to be introduced to a multi-stage branched optical waveguide 46 which is configured by combining the four-branched optical branch section 42 and a two-branched optical branch section 38.

In addition, the present invention is able to be applied not only to a branched optical waveguide which is configured by using an optical branch section for equally distributing the input light into N (N=2, 3, 4, ... ) optical waveguides, but also to a branched optical waveguide which is configured by using an optical branch section for distributing the input light into N (N=2, 3, 4, ... ) optical waveguides at any ratio.

For example, when the two-branched optical branch section 24 is used, output light with respect to the two optical waveguides 28 may be distributed at any ratio in addition to a ratio of 1:1. The optical branch section 24 for distributing the light at a ratio other than the ratio of 1:1 is able to be realized, for example, by arranging the two optical waveguides 28 (or the output terminals) on an output side in asymmetric positions in the 1×2 multimode interference waveguide.

In such a case, the phase control structure 20 is introduced by applying the present invention, and thus it is possible to inhibit the returning light. In this regard, the returning light is successfully inhibited as the output light with respect to the two optical waveguides 28 is distributed at a ratio closer to 1:1.

In addition, when the N-branched (N=3, 4, 5, ... ) optical branch section is used, the output light with respect to N optical waveguides may be distributed at any ratio in addition to an equal division.

In this regard, the returning light is successfully inhibited as a distribution ratio of the output light with respect to the N optical waveguides is closer to symmetry. When the output light is equally distributed to a pair of output terminals arranged in symmetric positions in the optical branch section, the inhibitive effect on the returning light is most satisfactory.

In the N-branched optical branch section, when the pair of output terminals arranged in the symmetric positions are set as an output terminal A and an output terminal B, the phase control structure 20 controls an absolute value $|L_A - L_B|$ of a difference between a light path length $L_A$ from the output terminal A of the previous-stage optical branch section to the next-stage optical branch section or the optical device, and a light path length $L_B$ from the output terminal B of the previous-stage optical branch section to the next-stage optical branch section or the optical device to be $(1/4 + i/2)\lambda$ (i=0, 1, 2, ... ).

For example, in the three-branched optical branch section 38 as illustrated in FIG. 12, when the output light with respect to the first output terminal 38b and the output light with respect to the third output terminal 38d are identical to each other, the returning light is maximally inhibited. In addition, in the four-branched optical branch section 42 as illustrated in FIG. 14, when the output light with respect to the second output terminal 42c and the output light with respect to the third output terminal 42d are identical to each other, and the output lights with respect to the first output terminal 42b and the fourth output terminal 42e are identical to each other, the returning light is maximally inhibited.

Figure 17:
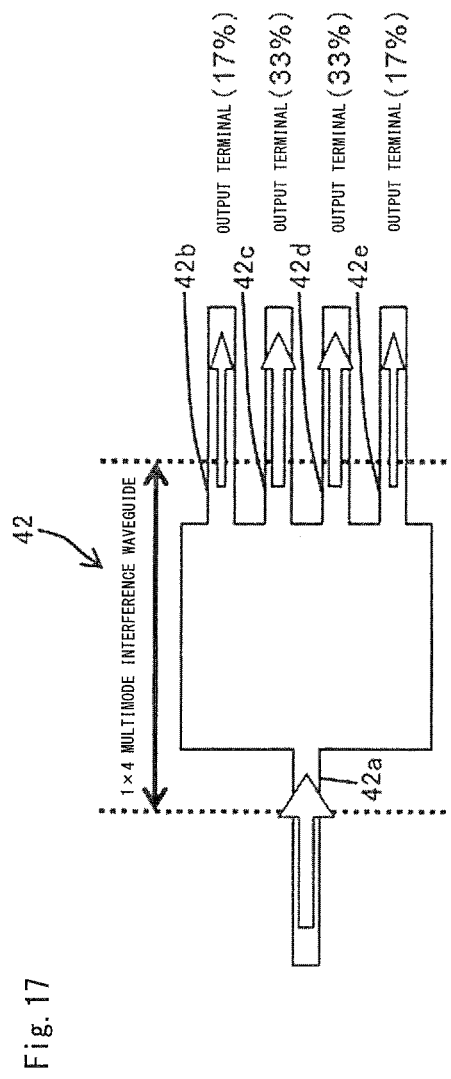
FIG. 17 is an explanatory view illustrating the 1×4 multi-mode interference waveguide in which light distribution with respect to an output terminal is not equal.

Specifically, as illustrated in FIG. 17, even when an output ratio with respect to the first output terminal 42b, the second output terminal 42c, the third output terminal 42d, and the fourth output terminal 42e of the four-branched optical branch section is not even at 1:2:2:1 (17%:33%:33%:17%), it is possible to successfully inhibit the returning light.

Furthermore, when an output with respect to the pair of output terminals arranged in the symmetric positions is shifted from 1:1, the inhibitive effect on the returning light is gradually decreased as the output ratio moves away from 1:1, and is not lost instantly.

(Phase Control Structure)

Next, the phase control structure 20 which is characteristic of the present invention will be described in more detail.

The phase control structure 20 is introduced to set an absolute value $|L_1 - L_2|$ of a difference between a light path length $L_1$ of a light path 1 from an output terminal 1 of the previous-stage optical branch section to the next-stage optical branch section or the optical device, and a light path length $L_2$ of a light path 2 from an output terminal 2 (which is paired up with the output terminal 1) of the previous-stage optical branch section to the next-stage optical branch section or the optical device to $(1/4 + i/2)\lambda$ (i=0, 1, 2, ... ).

When the light path 1 and the light path 2 are exactly identical to each other, the absolute value $|L_1 - L_2|$ of the light path difference is 0. In order to set the light path difference $|L_1 - L_2|$ to be equal to $(1/4 + i/2)\lambda$ (i=0, 1, 2, ... ), the light path 1 and the light path 2 are required to be different. The phase control structure 20 is a structure corresponding to a difference between the light path 1 and the light path 2.

The light path length is indicated by an integral $\int n \cdot dl$ with respect to ndl which is obtained by multiplying a distance dl and an effective refractive index n of the optical waveguide together. Accordingly, the light path length may be controlled by suitably adjusting the effective refractive index and the length of the optical waveguide.

Figure 18:
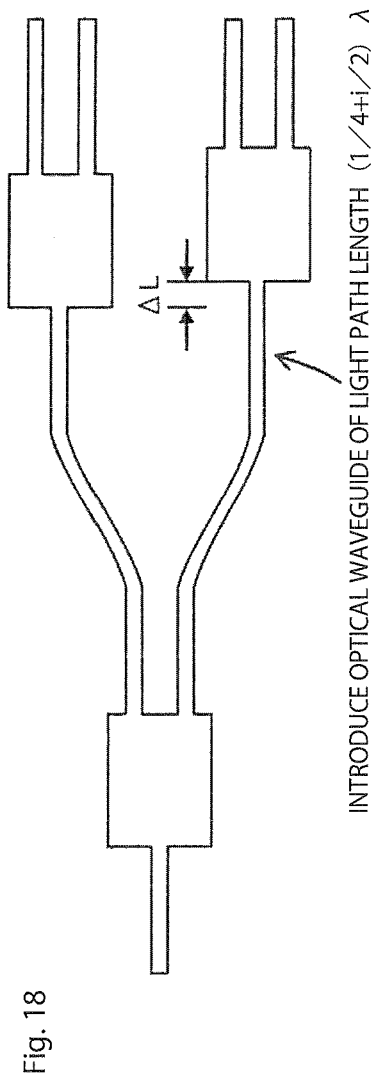
FIG. 18 is a schematic view illustrating the phase control structure in which a length of the optical waveguide is adjusted as a first embodiment of the phase control structure according to the present invention.

First, as a method for controlling the light path length, a method using the length of the optical waveguide will be described. As described in the above embodiment, for example, a method in which an optical waveguide of a light path length $n\Delta L = (1/4 + i/2)\lambda$ (i=0, 1, 2, ... ) is introduced as the phase control structure 20 as illustrated in FIG. 18 is included. "n" indicates an effective refractive index of the optical waveguide, and "$\Delta L$" indicates a length of the optical waveguide. The length $\Delta L$ of the optical waveguide may be suitably determined such that the light path length $n\Delta L = (1/4 + i/2)\lambda$ is satisfied. This method is able to be easily realized by adjusting the length of the optical waveguide as illustrated in FIG. 18.

Second, as the method for controlling the light path length, a method using the effective refractive index of the optical waveguide will be described. A case where the effective refractive index of the optical waveguide is changed by $\Delta n$ according to the introduction of the phase control structure 20 is considered. In this case, $\Delta n$ may be determined such that $|\Delta nL| = (1/4 + i/2)\lambda$ (i=0, 1, 2, ... ) is satisfied. "L" indicates a length of the optical waveguide. As the method for changing the effective refractive index of the optical waveguide, a method for changing a shape of the optical waveguide is included.

Figure 19:
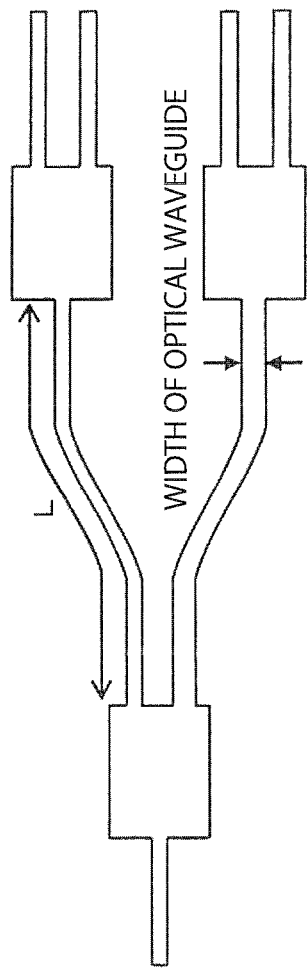
FIG. 19 is a schematic view illustrating the phase control structure in which a width (an effective refractive index) of the optical waveguide is adjusted as a second embodiment of the phase control structure according to the present invention.

For example, as illustrated in FIG. 19, it is possible to change the effective refractive index of the optical waveguide by changing a width of the optical waveguide. The width of the optical waveguide may be suitably determined such that $|\Delta nL| = (1/4 + i/2)\lambda$ is satisfied. This method is able to be easily realized by adjusting the effective refractive index of the optical waveguide (for example, the width of the optical waveguide) as illustrated in FIG. 19.

Figure 20:
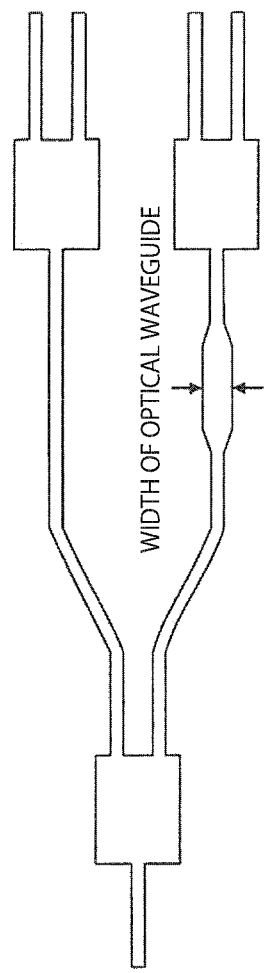
FIG. 20 is a schematic view illustrating the phase control structure in which the width (the effective refractive index) and the length of the optical waveguide are adjusted as a third embodiment of the phase control structure according to the present invention.
Figure 21:
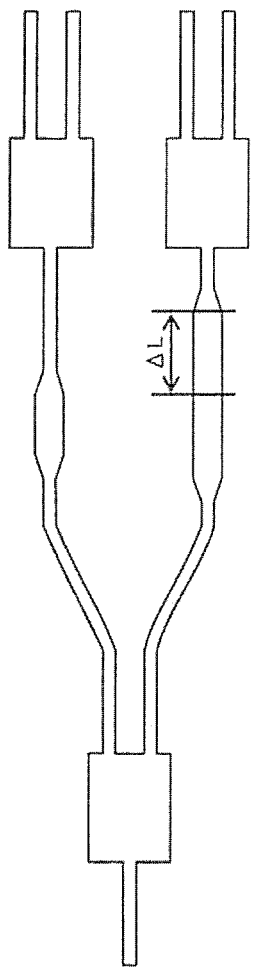
FIG. 21 is a schematic view illustrating the phase control structure in which the width (the effective refractive index) and the length of the optical waveguide are adjusted as a fourth embodiment of the phase control structure according to the present invention.

Third, as the method for controlling the light path length, a method using the effective refractive index and the length of the optical waveguide will be described. For example, as illustrated in FIG. 20 and FIG. 21, an optical waveguide of an effective refractive index $n + \Delta n$ and a length $\Delta L$ may be introduced as the phase control structure 20. At this time, the $\Delta n$ and the $\Delta L$ may be determined such that $|\Delta n \Delta L| = (1/4 + i/2)\lambda$ (i=0, 1, 2, ... ) is satisfied. In FIGS. 20 and 21, in order to change the effective refractive index of the optical waveguide, the width of the optical waveguide is adjusted.

In FIG. 20, since a tapered region in which the width of the optical waveguide is gradually changed is disposed in only one optical waveguide, in a strict sense, the light path difference is indicated by $|\int \Delta n dL|$. Accordingly, the $\Delta n$ and the $\Delta L$ are determined such that $|\int \Delta n dL|=(\frac{1}{4}+i/2)\lambda$ is satisfied.

In this regard, in FIG. 21, since the tapered region in which the width of the optical waveguide is gradually changed is disposed in both of the optical waveguides, the light path difference is simply indicated by $|\Delta n \Delta L|$. The method of FIG. 21 has an advantage in that the design is simple compared to the method of FIG. 20.

In addition, in order to control the light path length, the methods described above may be freely combined. In the present invention, the light path length $L_1=\int n_1 \cdot dl_1$ and the light path length $L_2=\int n_2 \cdot dl_2$ may be determined such that the absolute value $|L_1-L_2|$ of the light path difference is identical to $(\frac{1}{4}+i/2)\lambda$ (i=0, 1, 2, . . . ). Here, the phase control structure 20 is the structure corresponding to the difference between the light path 1 and the light path 2.

Ninth Embodiment of Light Source Circuit

Figure 22:
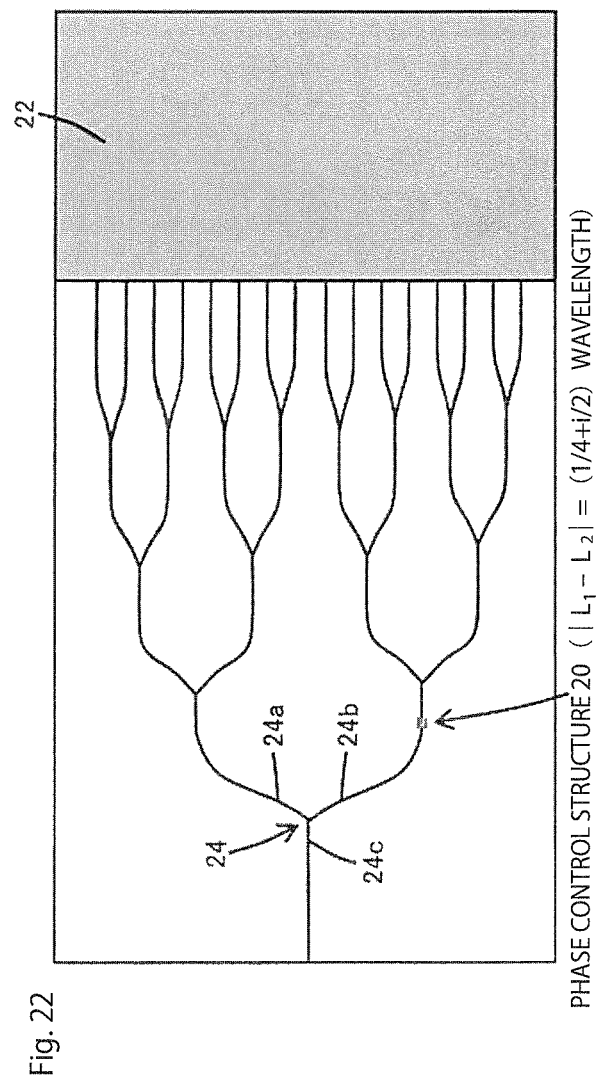
FIG. 22 is a schematic view illustrating the light source circuit in which the phase control structure is introduced to only one portion between a first stage branch section and a second stage branch section of the multi-stage branched optical waveguide as a ninth embodiment of the light source circuit according to the present invention.

Next, an introduction position of the phase control structure 20 which is characteristic of the present invention will be described. As illustrated in FIG. 22, in principle, the phase control structure 20 may be introduced to only one portion between the first stage branch section 24 and the second stage branch section 24.

It is possible to inhibit the returning light with respect to the input terminal 24*c* by setting the phases of the lights returned to the first output terminal 24*a* and the second output terminal 24*b* to be in the anti-phased state using the phase control structure 20.

However, in practice, positional dependence occurs in a property of the optical waveguide according to a manufacturing error, a temperature distribution on the substrate, or the like. Accordingly, in order to effectively inhibit the returning light, it is preferable that the phase control structure 20 be introduced to each branch section 24, as illustrated in FIG. 7. Even when the manufacturing error, the temperature distribution on the substrate, or the like is occurred, it is possible to sufficiently inhibit the returning light by increasing the number of phase control structures 20.

In addition, when the phase control structure 20 is introduced to the only one portion between the first stage branch section 24 and the second stage branch section 24, in order to inhibit the returning light, it is preferable that a configuration of the branch section or the optical device which is cascadingly connected to the first output terminal 24*a* and the second output terminal 24*b* is uniform. In this regard, when the phase control structure 20 is introduced to each of the branch sections 24, the returning light in each of the branch sections 24 is locally inhibited, and thus the configuration of the branch section or the optical device is able to be designed with a high degree of freedom.

In the description of the above embodiment, it is described that the phases of the lights returned to the first output terminal 24*a* and the second output terminal 24*b* are in the anti-phased state by using the phase control structure 20, and thus the returning light with respect to the input terminal 24*c* is able to be inhibited. This is because a single-mode optical waveguide is assumed as the optical waveguide connected to the input terminal 24*c*.

When the optical waveguide connected to the input terminal 24*c* is a multi-mode optical waveguide, the returning light may coupled to a high-order mode of the optical waveguide of the input terminal 24*c* at the time that the phases of the lights returned to the first output terminal 24*a* and the second output terminal 24*b* are in the anti-phased state by using the phase control structure 20, and thus the returning light is not able to be inhibited.

In such a case, a high-order mode cut filter may be introduced to the multi-mode optical waveguide of the input terminal 24*c*. Even when the optical waveguide connected to the input terminal 24*c* is the multi-mode optical waveguide, the returning light inhibitive effect described in the above embodiment is able to be similarly obtained by introducing the high-order mode cut filter.

Figure 23:
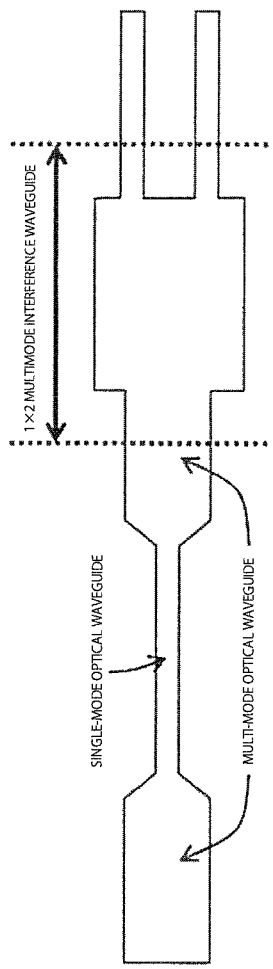
FIG. 23 is a schematic view illustrating a high-order mode cut filter in which a single-mode optical waveguide is connected to a multi-mode optical waveguide.

As the high-order mode cut filter, for example, the single-mode optical waveguide may be used. As illustrated in FIG. 23, the high-order mode is easily eliminated by connecting the single-mode optical waveguide to the multi-mode optical waveguide. Further, by devising the single-mode optical waveguide to be bent or the like, the high-order mode is able to be eliminated by a shorter distance.

In the present invention, the multi-mode optical waveguide may be used in addition to the single-mode optical waveguide.

As the semiconductor laser light source 14 of the embodiment described above, for example, a Fabry-Perot type semiconductor laser diode, a distributed Bragg reflection type semiconductor laser diode, and a distributed feedback type semiconductor laser diode may be used. Particularly, it is known that operation of the distributed feedback type semiconductor laser diode is likely to be unstable due to the returning light.

Figure 24:
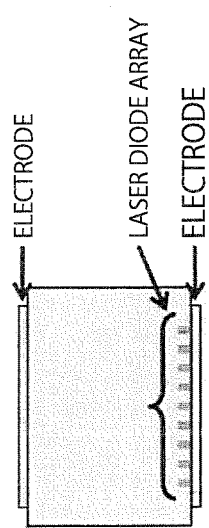
FIG. 24 is an explanatory view of a compound semiconductor laser diode array of the related art.

Further, in the present invention, as the semiconductor laser light source 14, a semiconductor laser diode array in which a plurality of laser diodes is formed between two electrodes on one chip as illustrated in FIG. 24 may be used.

Figure 25:
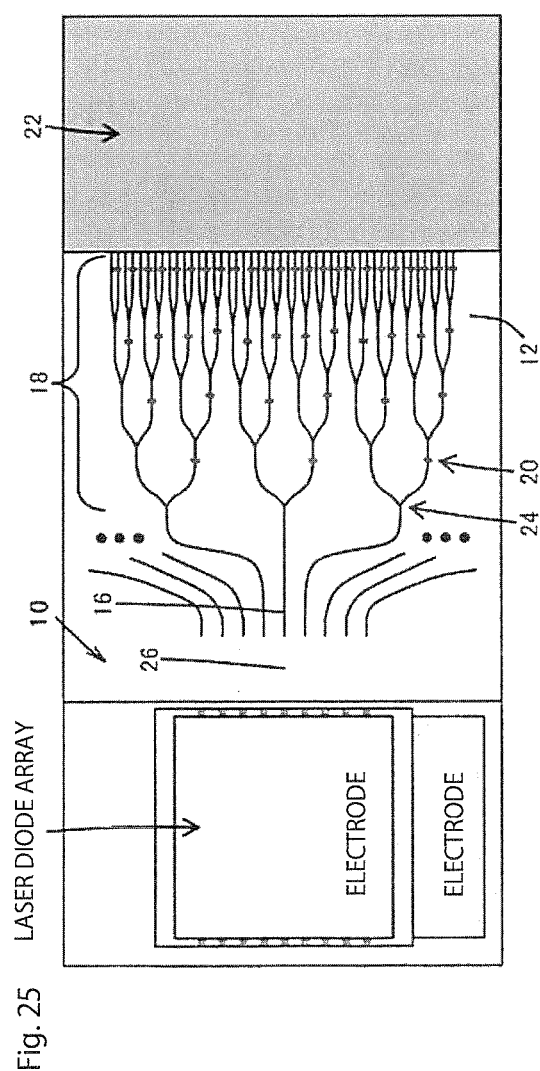
FIG. 25 is a plan view illustrating the entire configuration of the light source device according to the present invention which is provided with the semiconductor laser diode and the light source circuit including the branched optical waveguide.

In FIG. 25, an example of the embodiment of the light source device using the semiconductor laser diode array according to the present invention is illustrated. By using the semiconductor laser diode array, densification of the light source and an increase in the number of light outputs are realized.

In the light source device using the semiconductor laser diode array, a problem in which variation occurs in the light output from each laser diode due to the returning light exists.

In a case of the semiconductor laser diode array, the plurality of laser diodes is formed on the one chip, and the plurality of laser diodes is controlled by the two electrodes (a p-type electrode and an n-type electrode) at once. For this reason, it is not possible to deal with the problem when a variation occurs in the light output from each laser diode due to the returning light.

Thus, in the light source device using the semiconductor laser diode array, a major problem in which the operation of the light source device is likely to be unstable due to the returning light exists.

The present invention is able to be applied to the light source device using the semiconductor laser diode array, and thus provides a solution for realizing stabilization of the operation of the light source device using the semiconductor laser diode array.

Further, in the present invention, a mechanism for dynamically controlling the phase (the light path length) may be introduced to the phase control structure 20. Usually, as the mechanism for dynamically controlling the phase, a phase modulator used in an optical modulator, an optical switch, or the like may be used. For example, a refractive index of the optical waveguide is changed by using a thermo-optic effect, an electro-optic effect, and a carrier plasma effect, and thus the phase is able to be dynamically controlled.

By dynamically controlling the absolute value $|L_1-L_2|$ of the light path difference, an increase of the returning light caused by a dynamic change of the emission wavelength, a dynamic change of the device temperature or the like is able to be considerably inhibited, and thus the light source device is able to be more stably operated.

Tenth Embodiment of Light Source Circuit

Figure 26:
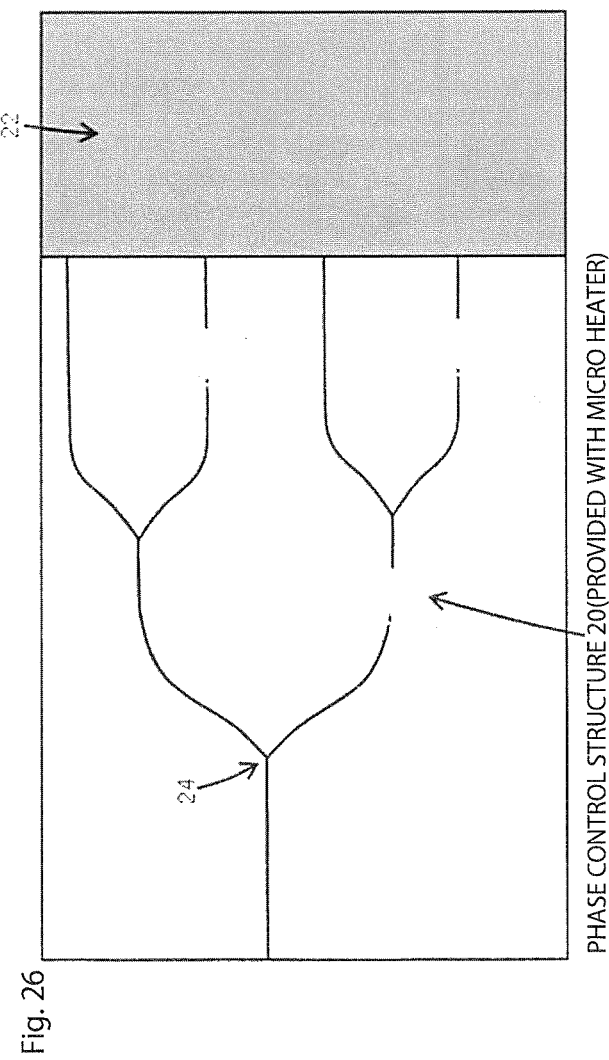
FIG. 26 is a schematic view illustrating the multi-stage branched optical waveguide including the phase control structure to which a micro heater (a phase modulator) is introduced as a tenth embodiment of the light source circuit according to the present invention.

For example, as illustrated in FIG. 26, the mechanism for dynamically controlling the phase is able to be introduced to the phase control structure 20 by introducing a micro heater (the thermo-optic effect).

Further, in the embodiment as illustrated in FIG. 9 of the present invention, a monitor may be connected to the second input terminal 36b of the directional coupler, and thus a state of the returning light may be observed. When the returning light with respect to the second input terminal 36b of the directional coupler is maximized, the returning light with respect to the first input terminal 36a of the directional coupler is maximally inhibited.

In addition, the 2×2 multimode interference waveguide may be used instead of the directional coupler.

Eleventh Embodiment of Light Source Circuit

Figure 27:
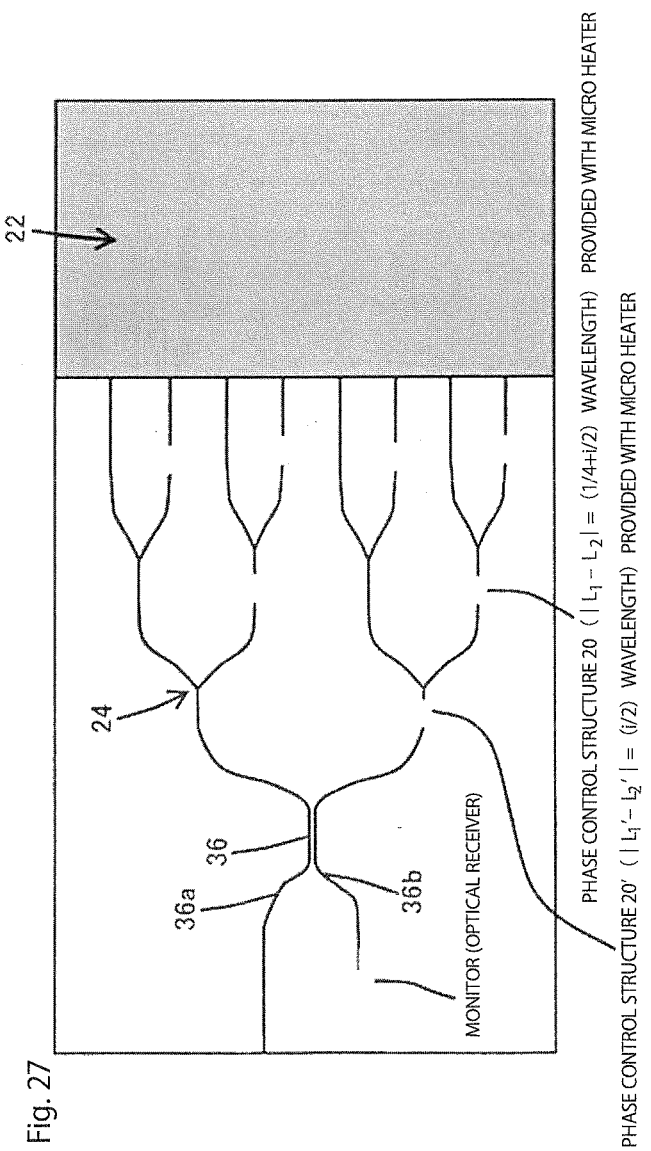
FIG. 27 is a schematic view illustrating the multi-stage branched optical waveguide in combination with the directional coupler which includes the phase control structure to which a monitor (an optical receiver) and the micro heater (the phase modulator) are introduced as an eleventh embodiment of the light source circuit according to the present invention.
Figure 28:
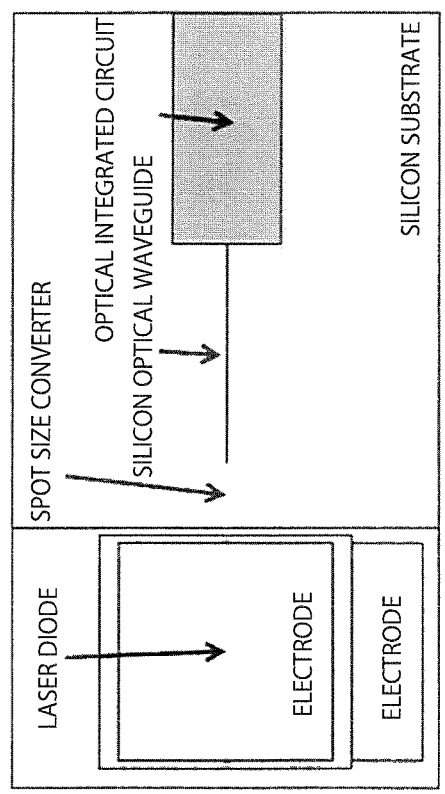
FIG. 28 is a diagram illustrating an example of the light source circuit using the compound semiconductor laser diode and the optical waveguide.
Figure 29:
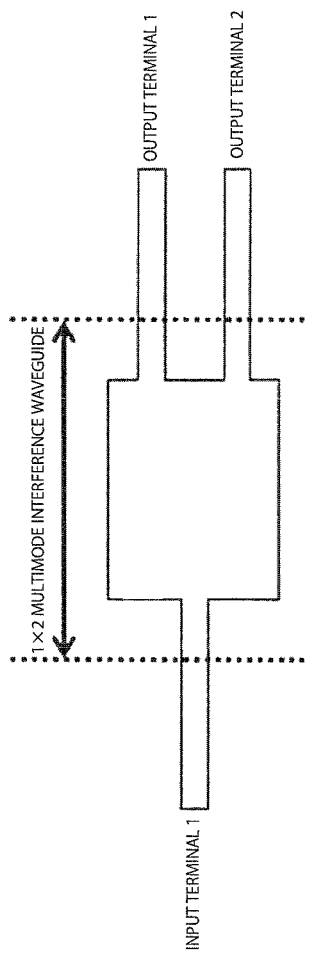
FIG. 29 is an explanatory view illustrating the 1×2 multi-mode interference waveguide of the related art which is a representative example of the branched optical waveguide.
Figure 30:
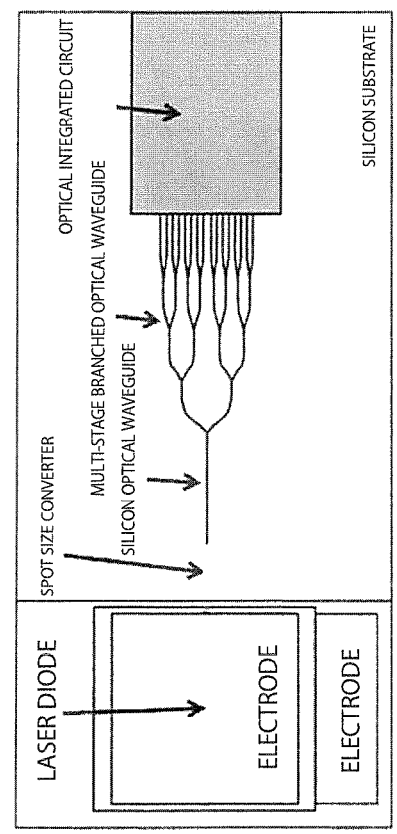
FIG. 30 is a diagram illustrating an example of a light source circuit of the related art which distributes light from one compound semiconductor laser diode into a plurality of light rays through the multi-stage branched optical waveguide.

For example, as illustrated in FIG. 27, by introducing an optical receiver as the monitor to the second input terminal 36b of the directional coupler, it is possible to observe the state of the returning light.

In FIG. 27, in addition to the monitor, a dynamic phase control mechanism using the micro heater (the thermo-optic effect) is introduced to the phase control structure 20' and the phase control structure 20. The phase is dynamically controlled according to an observed value of the monitor, and thus it is possible to more precisely inhibit the returning light.

As described above, the light source circuit 10 of the present invention is described with reference to the illustrated embodiments, but the present invention is not limited to the illustrated embodiments. For example, it is possible to introduce the phase control structure 20 to the optical waveguide 28 which connects the output terminal of the optical branch section of five or more branches and the next-stage optical branch section connected to the output terminal.

REFERENCE SIGNS LIST 10 light source circuit
12 device substrate
14 semiconductor laser diode light source
18 branched optical waveguide
20 phase control structure
22 optical device
24 optical branch section
24a first output terminal
24b second output terminal
24c input terminal
28 optical waveguide
30 two-stage branched optical waveguide
32 four-stage branched optical waveguide
34 one-stage branched optical waveguide
36 directional coupler
37 2×2 multimode interference waveguide
38 optical branch section
40 multi-stage branched optical waveguide
42 optical branch section
44 branched optical waveguide
46 multi-stage branched optical waveguide

The invention claimed is:

1. A light source circuit in which at least one optical branch section for branching one input side optical waveguide into at least a first output side optical waveguide and a second output side optical waveguide is formed on a substrate, and light incident from a semiconductor laser light source is transmitted to a plurality of optical devices, comprising:
a phase control structure for controlling a light path length in which a light path length $L_1$ of an optical waveguide between the optical branch section and a next-stage optical branch section or an optical device which is connected to the first output side optical waveguide extending from the optical branch section, and a light path length $L_2$ of an optical waveguide between the optical branch section and a next-stage optical branch section or an optical device which is connected to the second output side optical waveguide are controlled such that an absolute value of a difference between the light path length $L_1$ and the light path length $L_2$ is (¼+i/2) times (i is 0 or a positive integer) a wavelength of the light propagated through the light source circuit.

2. A light source device, comprising:
a semiconductor laser light source; and
the light source circuit according to claim 1, which is connected to the semiconductor laser light source.

3. The light source circuit according to claim 1,
wherein the phase control structure includes a dynamic phase control mechanism for dynamically adjusting the light path length.

4. The light source circuit according to claim 3,
wherein the dynamic phase control mechanism is a phase modulator.

5. The light source circuit according to claim 3,
wherein the dynamic phase control mechanism is a micro heater.

6. The light source circuit according to claim 1,
wherein a plurality of stages of the optical branch section is formed on the substrate.

7. The light source circuit according to claim 1,
wherein the optical branch section equally distributes the light to all of the output side optical waveguides.

8. The light source circuit according to claim 1,
wherein the optical branch section includes a 1×N multimode interference waveguide or a 1×NY branched optical waveguide (N is a positive integer of 2 or more).

9. The light source circuit according to claim 1,
wherein the substrate is a silicon substrate or an SOI substrate.

10. A light source circuit in which at least one optical branch section for branching one input side optical waveguide into at least a first output side optical waveguide and a second output side optical waveguide is formed on a substrate, and light incident from a semiconductor laser light source is transmitted to a plurality of optical devices,
wherein a light path length $L_1$ of an optical waveguide between the optical branch section and a next-stage optical branch section or an optical device which is connected to the first output side optical waveguide extending from the optical branch section, and a light path length $L_2$ of an optical waveguide between the optical branch section and a next-stage optical branch section or an optical device which is connected to the second output side optical waveguide are selected such that an absolute value of a difference between the light path length $L_1$ and the light path length $L_2$ is (¼+i/2) times (i is 0 or a positive integer) a wavelength of the light propagated through the light source circuit.

11. The light source circuit according to claim 10, wherein a plurality of stages of the optical branch section is formed on the substrate.

12. The light source circuit according to claim 10, wherein the optical branch section includes a 1×N multimode interference waveguide or a 1×NY branched optical waveguide (N is a positive integer of 2 or more).

13. The light source circuit according to claim 10, wherein the substrate is a silicon substrate or an SOI substrate.

14. A light source device, comprising:
a semiconductor laser light source; and
the light source circuit according to claim 10, which is connected to the semiconductor laser light source.

15. The light source device according to claim 14, wherein the semiconductor laser light source includes a compound semiconductor laser diode or a compound semiconductor laser diode array.

16. The light source circuit according to claim 10, wherein the optical branch section equally distributes the light to all of the output side optical waveguides.

17. The light source circuit according to claim 10, wherein a directional coupler or a 2×2 multimode interference waveguide is disposed in a previous stage to the input side optical waveguide of the optical branch section.

18. The light source circuit according to claim 17, wherein a light path length $L_A$ from the first output side optical waveguide of the directional coupler or the 2×2 multimode interference waveguide to the next-stage optical branch section, and a light path length $L_B$ from the second output side optical waveguide of the directional coupler or the 2×2 multimode interference waveguide to the next-stage optical branch section are selected such that an absolute value of a difference between the light path length $L_A$ and the light path length $L_B$ is i/2 times (i is 0 or a positive integer) the wavelength of the light transmitted through the light source circuit.

19. The light source circuit according to claim 17, wherein an optical monitor is connected to one input side optical waveguide of the directional coupler or the 2×2 multimode interference waveguide.

20. A light source circuit in which at least one optical branch section for sequentially branching one input side optical waveguide into at least a first output side optical waveguide, a second output side optical waveguide, a third output side optical waveguide, and a fourth output side optical waveguide is formed on a substrate, and light incident from a semiconductor laser light source is transmitted to a plurality of optical devices,
wherein the first to the fourth output side optical waveguides extend from the optical branch section to a next-stage optical branch section or the optical device, the first and the fourth output side optical waveguides, and the second and the third output side optical waveguide are paired, respectively, and a light path length is selected such that an absolute value of a difference between a light path length of one output side optical waveguide of each pair of output side optical waveguides of the optical branch section and a light path length of the other output side optical waveguide of each pair of output side optical waveguides of the optical branch section is (¼+i/2) times (i is 0 or an positive integer) a wavelength of the light transmitted through the light source circuit.

21. The light source circuit according to claim 20, wherein a directional coupler or a 2×2 multimode interference waveguide is disposed in a previous stage to the input side optical waveguide of the optical branch section.

22. The light source circuit according to claim 21, wherein a light path length $L_A$ from the first output side optical waveguide of the directional coupler or the 2×2 multimode interference waveguide to the next-stage optical branch section, and a light path length $L_B$ from the second output side optical waveguide of the directional coupler or the 2×2 multimode interference waveguide to the next-stage optical branch section are selected such that an absolute value of a difference between the light path length $L_A$ and the light path length $L_B$ is i/2 times (i is 0 or a positive integer) the wavelength of the light transmitted through the light source circuit.

23. The light source device according to claim 22, wherein the semiconductor laser light source includes a compound semiconductor laser diode or a compound semiconductor laser diode array.

24. The light source circuit according to claim 20, wherein the optical branch section equally distributes the light to all of the output side optical waveguides.

25. The light source circuit according to claim 20, wherein a directional coupler or a 2×2 multimode interference waveguide is disposed in a previous stage to the input side optical waveguide of the optical branch section.

26. The light source circuit according to claim 25, wherein a light path length $L_A$ from the first output side optical waveguide of the directional coupler or the 2×2 multimode interference waveguide to the next-stage optical branch section, and a light path length $L_B$ from the second output side optical waveguide of the directional coupler or the 2×2 multimode interference waveguide to the next-stage optical branch section are selected such that an absolute value of a difference between the light path length $L_A$ and the light path length $L_B$ is i/2 times (i is 0 or a positive integer) the wavelength of the light transmitted through the light source circuit.

27. The light source circuit according to claim 20, wherein the optical branch section includes a 1×N multimode interference waveguide or a 1×NY branched optical waveguide (N is a positive integer of 2 or more).

28. The light source circuit according to claim 20, wherein the substrate is a silicon substrate or an SOI substrate.

29. A light source device, comprising:
a semiconductor laser light source; and
the light source circuit according to claim 20, which is connected to the semiconductor laser light source.

30. The light source device according to claim 29, wherein the semiconductor laser light source includes a compound semiconductor laser diode or a compound semiconductor laser diode array.

* * * * *